INVENTORS
ARTHUR G. ROYER
SHERMAN S. WATTS
BY
ATTORNEYS

April 18, 1961  A. G. ROYER ET AL  2,980,422
PILE ELEVATING MECHANISM

Filed June 5, 1959  10 Sheets-Sheet 2

INVENTORS
ARTHUR G. ROYER
SHERMAN S. WATTS
BY Hudson, Boughton,
Williams, David & Hoffman
ATTORNEYS INVENTORS
ARTHUR G. ROYER
SHERMAN S. WATTS
BY Hudson, Boughton,
Williams, David & Hoffmann
ATTORNEYS April 18, 1961 A. G. ROYER ET AL 2,980,422
PILE ELEVATING MECHANISM
Filed June 5, 1959 10 Sheets-Sheet 6
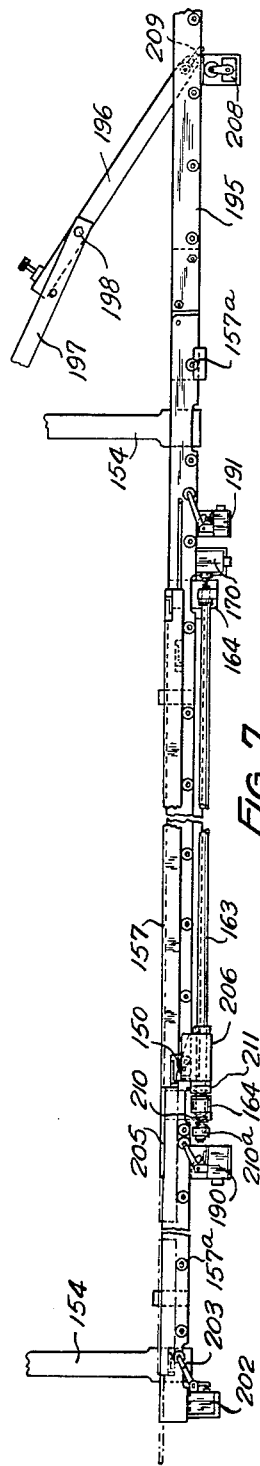
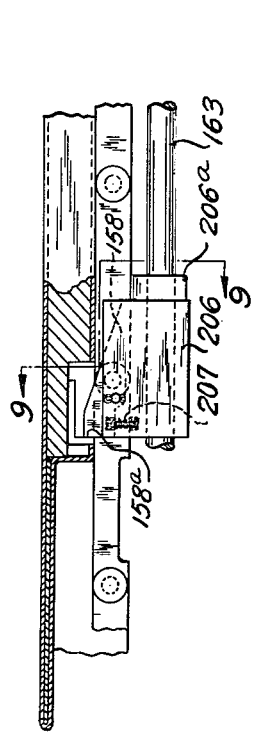
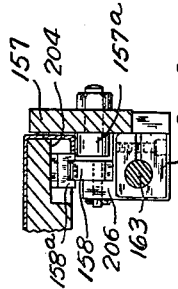
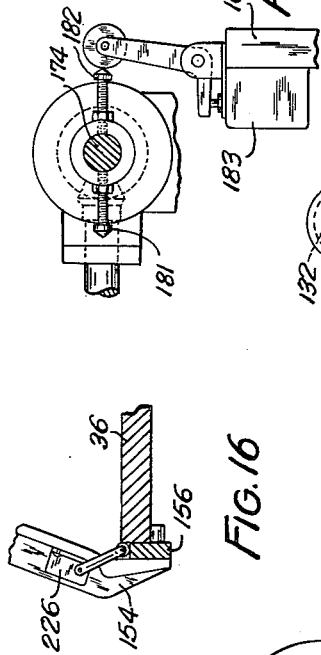
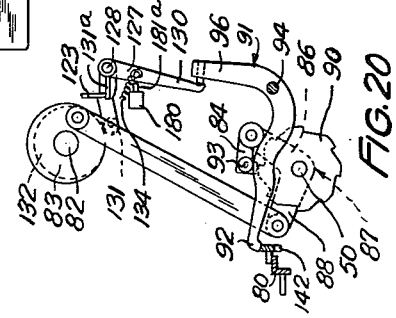
INVENTORS
ARTHUR G. ROYER
BY SHERMAN S WATTS
Hudson, Coughton,
Williams, David & Hoffmann
ATTORNEYS

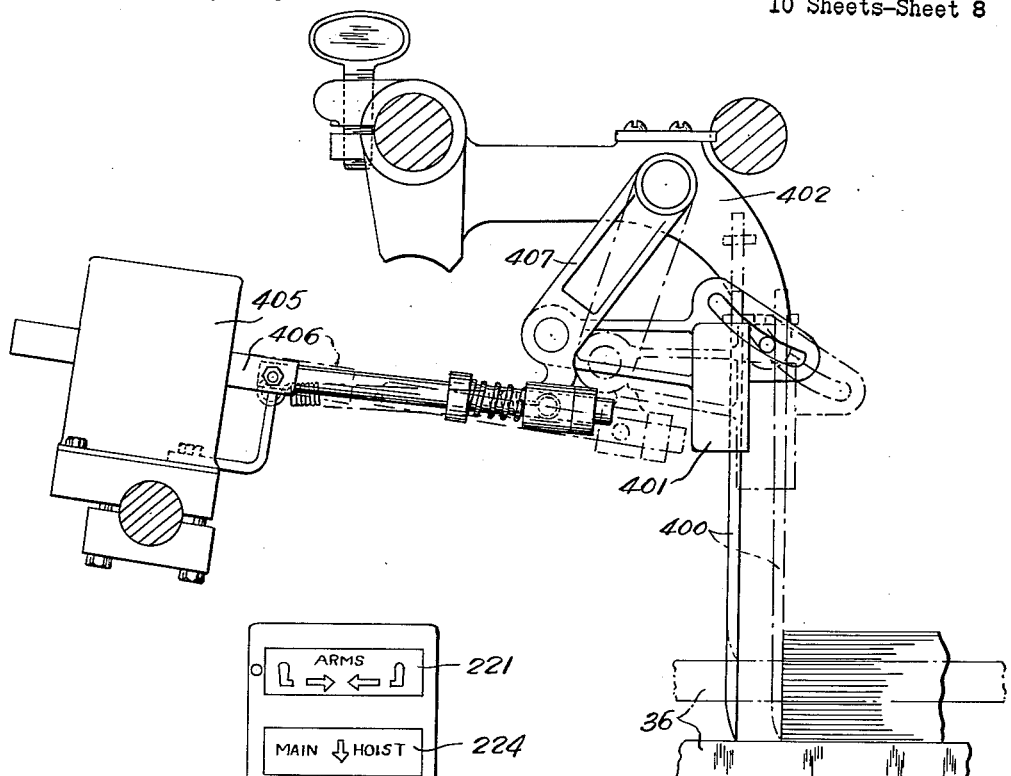
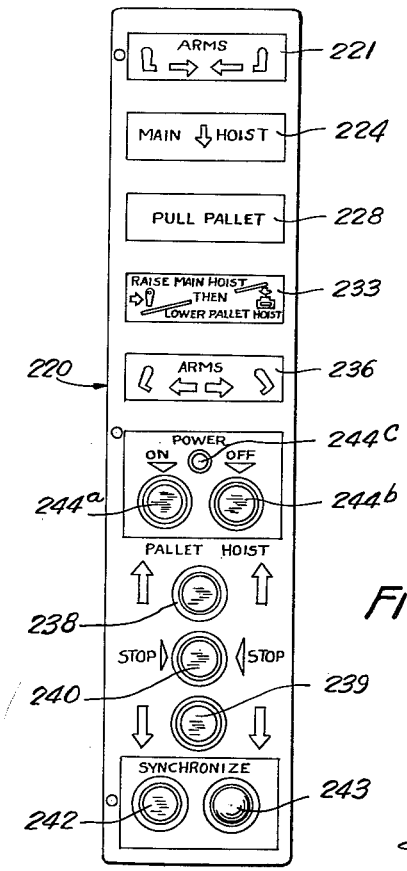

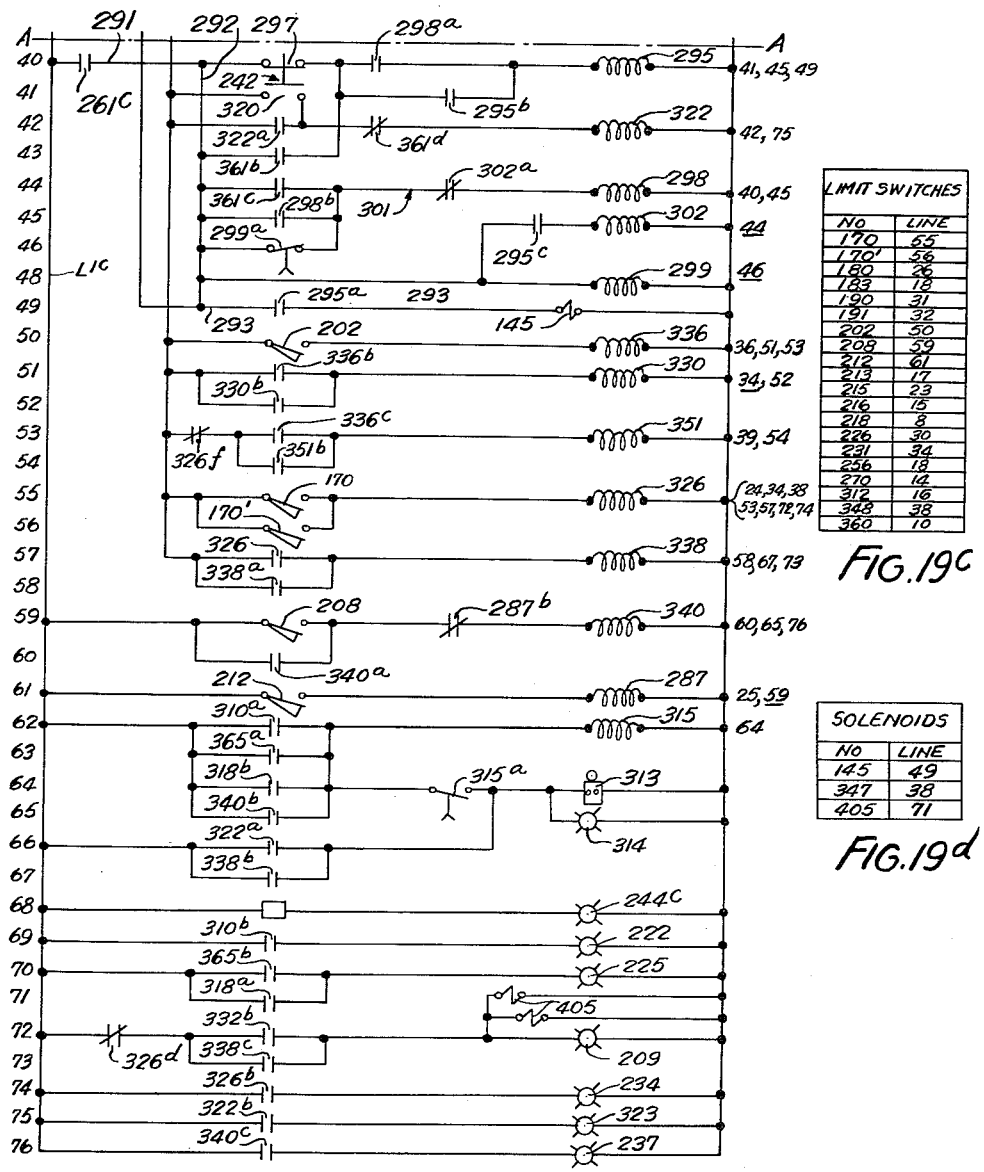

મ2,980,422

PILE ELEVATING MECHANISM

Arthur G. Royer, Cleveland Heights, and Sherman S. Watts, Shaker Heights, Ohio, assignors to Harris-Intertype Corporation, Cleveland, Ohio, a corporation of Delaware Filed June 5, 1959, Ser. No. 818,313

23 Claims. (Cl. 271—62)

The present invention relates to a pile elevating mechanism for elevating a sheet pile while sheets are being periodically removed from the top thereof to maintain the top of the pile at approximately a predetermed level, and, more particularly, to such a mechanism having main and auxiliary hoists so that the pile may be replenished from below without interrupting the sheet removing operation.

It is known in a continuously feeding pile elevating mechanism to provide a main pole hoist and an auxiliary pile hoist disposed above the main pile hoist and adapted to take a remnant or partially depleted pile therefrom and continue its elevation while a new pile is being brought into position on the main hoist. Such a mechanism is shown in United States Patent No. 2,701,136 to Morton Schmidt. In this type of apparatus the main pile hoist is operated to intermittenly elevate a pile of sheets thereon as the top sheets of the pile are removed and until the major portion of the pile is exhausted and a partially depleted or remnant pile remains. At this time the remnant pile is transferred from the main pile hoist to the auxiliary pile hoist, the latter then being operated to raise the pile as sheets are removed from the top of the remnant pile and while a new pile of sheets is placed on the main pile hoist. Conventionally the piles are supported on pallets with the pallets being engaged and lifted by the hoists to elevate the piles. After a new pile on a pallet has been brought into position, the new pile is elevated to a position where the top of the new pile is disposed in juxtaposition to the underside of the pallet supporting the remnant pile and the pallet supporting the remnant pile is subsequently withdrawn from below the remnant pile to deposit the remnant pile onto the top of the new pile thereby combining the piles, the main hoist then being operated to maintain the top of the combined pile at the proper level.

In one type of known apparatus, the height of the top of the pile is gauged by pile-height gauging means which effects operation of the pile hoists to maintain, during normal operation, the top of the pile from which sheets are being taken at a height which enables sheet separating and forwarding suckers disposed above the rear edge of the pile to function properly. As is disclosed in the application for Letters Patent Serial No. 698,430, filed November 25, 1957, by Arthur G. Royer, pallets used to support the piles on the hoists have been constructed to have a reduced thickness at the edge which is drawn last from under the remnant pile during the pile combining operation so that the rear edges of the new and remnant piles may be brought closer together than the thickness of the pallet before the pallet is completely withdrawn and the rear edge of the remnant pile permitted to drop onto the new pile. This prevents the rear edge of the remnant pile from dropping, at one time, the full thickness of. the pallet as the latter is withdrawn. If the rear edge dropped the full thickness of the pallet in one step, the drop would lower the top of the rear edge to a point where it would be difficult or impossible for the sheet separating suckers to reach the top of the pile.

The proper operation of known continuous feeding pile elevating mechanism is heavily dependent upon an attentive and alert operator because certain operations must be performed at particular times and preparatory steps must be taken for many of the operations. As a result an operator must keep all steps in mind and be prepared when each is to take place.

It is an important object of the present invention to provide an elevating mechanism of the type described which is simplified in operation, requires less operator attention and is more foolproof than the prior art mechanisms, and in which a new pile may be brought into position in less time than heretofore required.

Another object of the present invention is to provide a pile elevating mechanism of the type described which can be operated by one man.

Another object is to provide a new and an improved mechanism of the type described in which the main and auxiliary hoists are raised and lowered by means operable independently of each other and at any time during the elevating operation, and in which pile height detecting means is operable to control one or the other, or both, of the hoists simultaneously.

Yet another object is to provide a new and an improved pile elevating mechanism having main and auxiliary hoists controllable by pile height detecting means and in which the main hoist is automatically disconnected from the pile height detecting means when the auxiliary hoist takes the pile therefrom and preferably wherein the taking of the pallet by the auxiliary hoist automatically places it under the control of the pile height detecting means when the pile thereon is taken by the auxiliary hoist and can be thereafter raised and lowered by power independently of the detector and can again be placed under the control of the detector so that both hoists are raised together in response to a low level detection.

A further object of the present invention is to provide a new and an improved pile elevating mechanism having main and auxiliary hoists and in which the pallet may be withdrawn to support the rear edge of the pile thereon with a relatively thin portion to permit the auxiliary and main hoists to be moved toward each and reduce the rear edge pile drop when the pallet is completely withdrawn, the auxiliary hoist and pallet being so constructed that the pallet is automatically stopped in proper rear pile edge-supporting position upon withdrawal of the pallet.

A still further object is the provision of a pile elevating mechanism as in the preceding object in which the pallet is stopped by a latch which is releasable by lifting the pallet relative thereto.

It is also an object of the present invention to provide a new and an improved method of operating the type of elevating mechanism described to provide a smooth change-over of the piles from one hoist to another and to facilitate the combining of the piles.

It is further an object of the present invention to provide a new and an improved pile elevating mechanism of the type described in which stops are moved into position against the rear edge of the remnant pile in response to pallet withdrawal.

Furthermore, it is an object to provide a pile elevating mechanism of the type described wherein the engagement and release of a latch member for arresting the withdrawal of the pallet on the auxiliary hoist are sensed to signal that the hoists are to move toward each other and that the pallet is to be withdrawn.

Further objects and advantages of the present invention will be apparent from the following description of the preferred embodiment thereof made with reference to the accompanying drawings forming a part of the present specification and in which:

Fig. 7 is a sectional view taken approximately from lines 7—7 of Fig. 3;

Fig. 8 is an enlarged fragmentary view of a portion of Fig. 7;

Fig. 9 is a sectional view taken approximately along lines 9—9 of Fig. 8;

Figure 1:
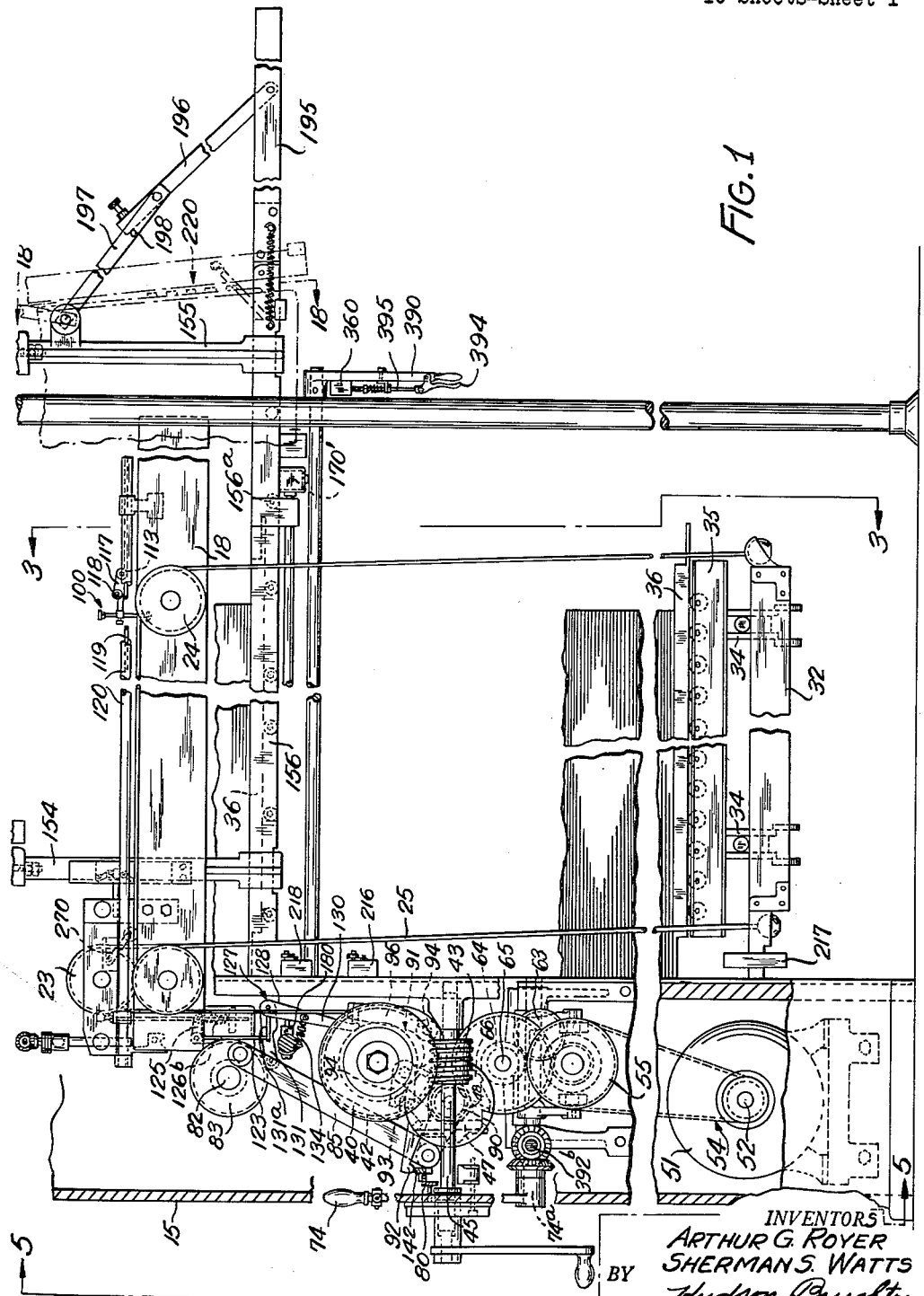
Fig. 1 is a side elevational view of a pile elevating mechanism embodying the present invention with parts thereof cut away or removed.
Figure 3:
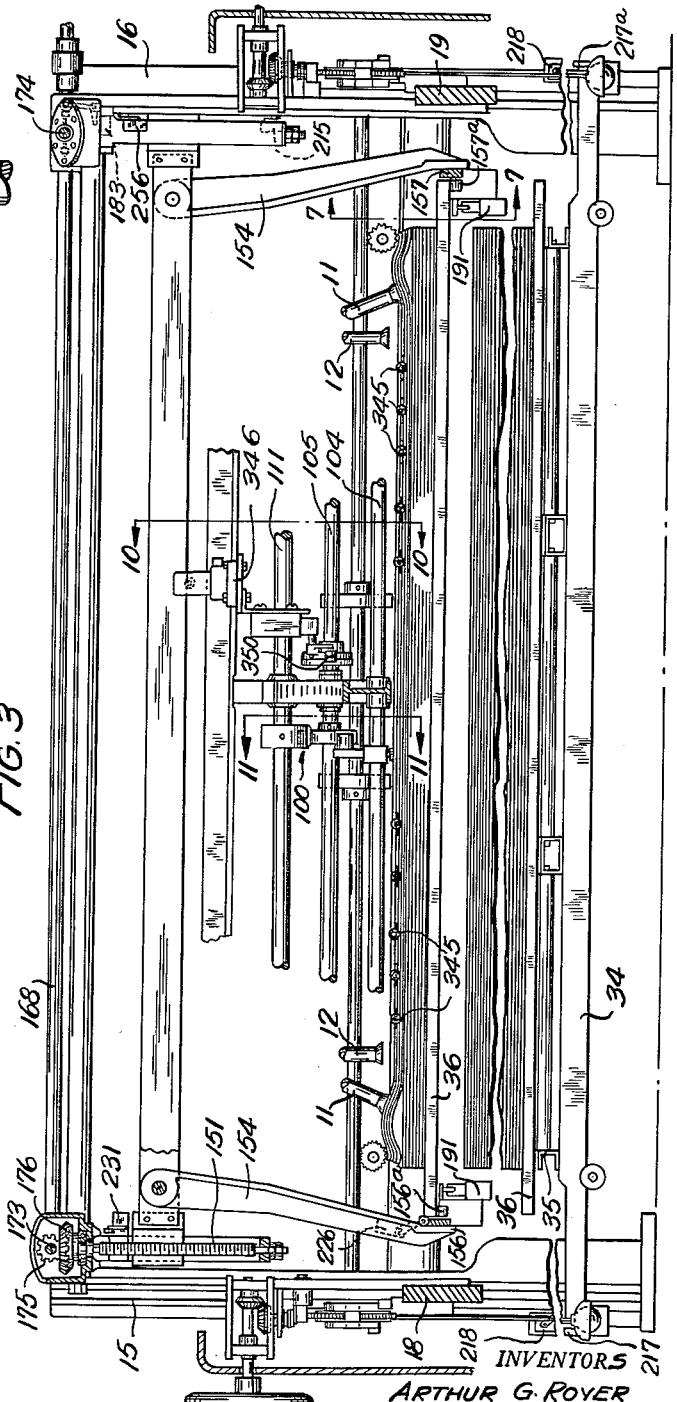
Fig. 3 is a vertical sectional view taken approximately along line 3—3 of Fig. 1.
Figure 10:
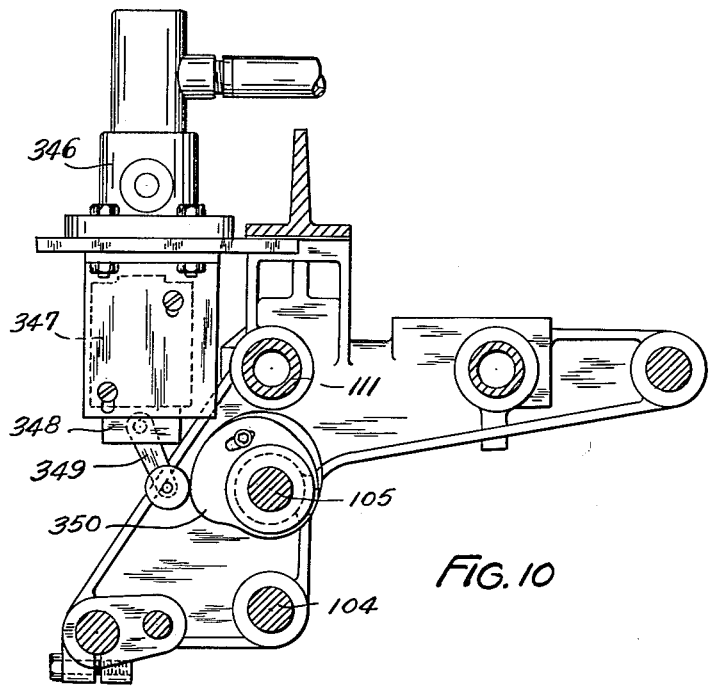
Figure 11:
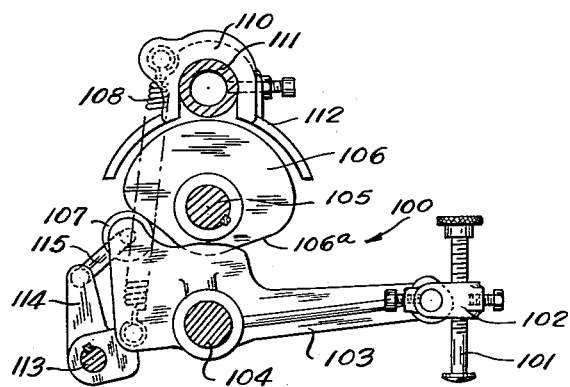
Figure 19:
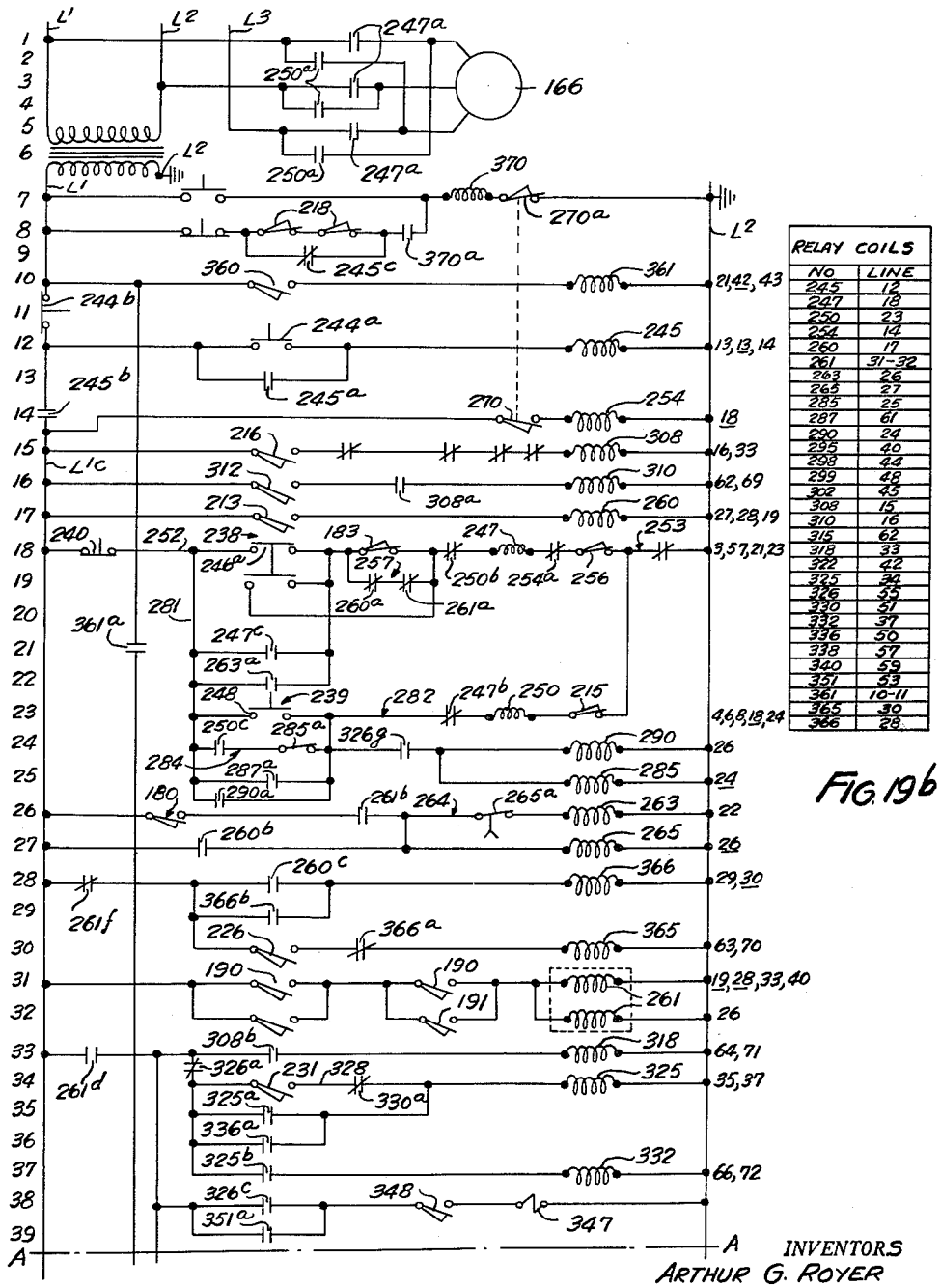

Figs. 10 and 11 are sectional views taken approximately from lines 10—10 and 11—11 of Fig. 3;

Figs. 12, 13, 14, 15, 16 and 17 are fragmentary views showing the locations of various switches;

Fig. 18 is a view of a control panel for the mechanism taken looking from line 18—18 of Fig. 1;

Figs. 19 and 19a constitute an across-the-line circuit diagram for the elevating mechanism shown in Fig. 1 and in accordance with conventional practice the lines of the diagram are numbered and the line numbers of the contacts of the various coils are shown adjacent the coil;

Figs. 19b, c and d are locater tables for the relay coils, switches and solenoids in the circuit diagram of Figs. 19, 19a;

Fig. 20 is a fragmentary view showing the pawl and ratchet mechanism for operating the main hoist; and Fig. 21 is a view showing a backstop member adapted for use in the elevating mechanism of Fig. 1.

The pile elevating mechanism shown in the drawing comprises main and auxiliary pile hoists which operate to support a pile of sheets while the top sheets are periodically removed therefrom and to elevate the pile to maintain the top of the pile at an approximate level required for proper operation of sheet separating and forwarding means associated with the pile elevating mechanism. The sheet separating and forwarding means comprises separating suckers 11 adapted to pick up the top sheet of the pile and sheet forwarding suckers 12 for forwarding the separated sheet to conventional pull-in rolls, not shown, but which are disposed adjacent the front of the pile at approximately the level of the suckers 12 and are adapted to take the sheet and feed it to a sheet-handling mechanism.

The pile elevating mechanism shown includes front stationary columns 15, 16 and rear stationary uprights 17 and side frame members 18, 19 extending along the opposite sides of the mechanism and connecting the front and rear uprights on that side of the mechanism, the member 18 joining front column 15 and one rear upright 17, and side frame member 19 joining front column 16 and the other rear upright 17. Transversely spaced, stationary guides are provided between the front columns 15, 16 and are adapted to engage the front of the piled sheets being elevated to guide the sheets in their vertical movement.

As previously stated, the pile elevating mechanism includes a pile hoist for elevating a pile of sheets to a level where the top sheets are to be removed by the suckers 11 with the main pile hoist being operated intermittently to maintain the top of the pile thereon at the proper level. The main pile hoist includes front and rear pulleys 23, 24 mounted on the side member 18 and over which cables 25, 26, respectively, are trained, and front and rear pulleys 27, 28, respectively, mounted on side frame member 19 and over which cables 30, 31, respectively, are trained. The cables 25, 26 and 30, 31 have knobs at their lower ends adapted to be attached to the ends of longitudinal rails 32, 33 which carry cross rails 34 that extend under a skid or pallet platform 35 upon which a pallet 36 is adapted to be supported. The pallet 36 carries the pile of sheets to be removed one at a time by the sheet separating and forwarding mechanism. The longitudinal rail 32 is connected to the ends of cables 25, 26, while the longitudinal rail 33 is connected to the ends of cables 30, 31.

The cables 25, 26 and 30, 31 are wound on individual drums 40 fixed to a drum shaft 41 that extends between the front columns 15, 16 of the pile elevating mechanism and is generally supported therein. The drums 40 over which the cables 25, 26 are wound are fixed to the near end of the shaft as the elevating mechanism is viewed in Fig. 1, and the drums over which the cables 30, 31 are wound are fixed to the shaft 41 adjacent the remote end of the shaft as viewed in Fig. 1.

It can now be seen that rotation of the shaft 41 to wind or unwind the cables of the main hoist onto or from their respective drums will cause either the raising or the lowering of the main hoist. The drums 40 are narrow drums and the cables wrap on themselves as they are wound on the drums. The drums, therefore, have an effective diameter which varies with the amount of cable wound thereon and the amount of raising and lowering of the main hoist for a given angular rotation of the drums will depend upon the position of the hoist which is indicative of the length of cable wound on the drums.

In the preferred and illustrated embodiment, the drum shaft 41 has a worm wheel 42 fixed to the shaft adjacent the drums 40 for the cables 25, 26 and adjacent the front column 15. The worm wheel 42 meshes with a worm 43 disposed below the worm wheel 42 and fixed to a worm shaft 45 journaled in the column 15 and which extends outwardly thereof and has an outer end, square in cross section, for receiving a crank 46. The crank 46 has an opening therein opening into one side thereof, which opening is square at its inner end and cylindrical at its outer end so that when the crank is moved rightwardly as viewed in Fig. 1 into driving relationship with the worm shaft it is disposed axially inwardly on the shaft to enable the crank to engage the square opening therein with the shaft, but is disengaged if moved outwardly to where the cylindrical part of the opening is about the square end of the shaft. When the crank is engaged, rotation thereof by hand will rotate the worm wheel 42 and the shaft 41 to raise or lower the main hoist manually.

The worm shaft 45 also has a bevel gear 47 fixed thereto adjacent the worm 43. The bevel gear 47 meshes with a cooperating bevel gear 48 fixed to a drive shaft 50 extending transversely of the front of the elevating mechanism and rotatable by power means to effect a power raising or lowering of the main hoist.

The drive shaft 50 may be selectively driven in either direction from a motor 51 mounted at the base of the column 15. The motor has a shaft 52 which is connected to drive a clutch shaft 53, disposed above the motor 51 and below the shaft 50 and journalled in the columns 15, 16, through a chain drive 54 which includes a gear or sprocket 55 fixed to the clutch shaft 53 and an input or driving gear or sprocket 56 fixed to the motor shaft 52. The motor 51 and, in turn, the clutch shaft 53 are continuously operated in one direction. The clutch shaft 53 may be connected to drive the drive shaft 50, to, in turn, effect a rotation of the cable drums 40, through a gear train 58 which effects rotation of the drive shaft 50 in one direction or through a gear train 59 which effects rotation of the drive shaft 50 in the opposite direction.

The gear train 58 includes a gear 61 journaled on the clutch shaft 53 and a clutch mechanism 62 for clutching the gear 61 to the shaft 53 for rotation therewith. The gear 61 is in mesh with an idler gear 63 which, in turn, meshes with a gear 64 secured to a gear shaft 65 and in mesh with a gear 66 fixed to the drive shaft 50. When the clutch 62 is engaged, the gear 61 will effect a driving of the drive shaft 50 through the train 58 in a direction opposite to the direction of rotation of the clutch shaft 53.

The gear train 59 comprises a gear 68 journaled on the clutch shaft 53 and a gear 70 in mesh with the gear 68 and fixed to the gear shaft 65. The gear 68 may be selectively clutched to the shaft 53 by operation of a clutch mechanism 71 to effect rotation of the gear 68 with the shaft 53. When the gear 68 rotates with the shaft 53, the gear shaft 65 and the gear 70 thereon and in mesh with the gear 68 rotate in the opposite direction to the clutch shaft 53 which, in turn, effects rotation of the drive shaft 50 in the same direction as the clutch shaft 53 through the medium of gears 64 and 66. The clutch mechanisms 62, 71 are disposed adjacent each other on the clutch shaft 53 and each includes a driving clutch plate 72 which is slidably keyed to the clutch shaft 53 and which is movable to engage a respective driven clutch plate 73 secured to the gear driven by the respective clutch mechanism. The clutch plates are spring biased to a disengaged position. The driving clutch plates 72 may be selectively engaged with the driven plates by operation of a clutch actuating lever 74 fixed to a shaft 74a journaled for rocking movement about an axis above the clutch shaft 53 that extends perpendicular with respect to the shaft 53. The clutch actuating lever has a portion 75 which extends downwardly between the clutch plates 72 of the clutch mechanisms 62, 71 and carries a roller 76 which when the lever is swung in one direction engages and shifts the clutch plate 72 of the clutch mechanism 62 to engage the latter and actuate the drive shaft 50 in one direction and when swung in the other direction engages and moves the clutch plate 72 of the clutch mechanism 71 to its engaged position to rotate the shaft 50 in the opposite direction. The operating handle 74 extends upwardly above the pivot for the lever and in a position to be grasped by the operator. For purposes which will be explained hereinafter, the manual operating lever 74 is normally latched in a neutral position by a latch member 80 having a slot 81 therein adapted to receive a pin 81a on the manual operating lever 74. The latch member 80 must be moved clear of the pin 81a to permit the lever 74 to be operated to engage either the clutch 62 or the clutch 71 to drive the main hoist from the motor 51.

During operation, the main hoist is operated in increments from the press drive to maintain the top thereof or of the pile thereon at an appropriate feed level. The mechanism for raising the main hoist in increments or in a stepwise manner comprises a continuously rotating crank shaft 82 which extends across the front of the pile elevating mechanism. When the pile elevating mechanism is used in connection with feeding apparatus for delivering sheets to a printing press, the shaft 82 is preferably driven directly from the printing press drive so as to be timed therewith.

The crank shaft 82 has secured to its end adjacent the column 15 a crank 83 which is connected by a link 85 to reciprocate a pawl 84. As is best shown in Figs. 1 and 20, the pawl 84 is pivoted to one end of one arm 86 of a bell-crank lever 87 journaled on the drive shaft 50, and the lever 87 also having an arm 88 to which the connecting link 85 is pivotally connected to effect a continuous reciprocation of the lever 87 and pawl 84 from the continuously rotating crank 83. The pawl 84 is adapted to engage and advance, in increments, a ratchet wheel 90 fixed to the drive shaft 50. The ratchet wheel 90 when rotated by the pawl 84 effects rotation of the shafts 50 in the direction necessary to raise the main hoist. The pawl 84 is disposed above the ratchet wheel 90 and drops by gravity into engagement with the ratchet teeth of the ratchet wheel 90 unless positively prevented from doing so.

The pawl 84 may be prevented from engaging the teeth of the ratchet wheel 90 when the pawl is reciprocated by raising a pawl lift member 91. The lift member 91 includes a lift arm 92 that extends generally horizontally below the pawl 84, the arm 92 having an upper arcuate surface which is adapted to engage a roller 93 on the pawl 84 and to lift the pawl clear of the ratchet teeth 90 when the arm 92 and the lift member 91 are raised. The pawl lift member 91 is pivoted, as indicated at 94, so that rotation of the lift member 91 in a clockwise direction about the pivot 94 effects a lifting of pawl 84 and prevents it from engaging the teeth of the ratchet wheel 90. The pivotal connection between the pawl 84 and its supporting arm 86 of bell-crank lever 87 permits reciprocation of the bell-crank lever 87 by the crank 83 when the pawl is lifted.

When the main hoist is being operated under the control of pile height detecting means, the lift member 91 is raised when the top of the pile on the main hoist is at the proper level for removing sheets therefrom and the lift member 91 is lowered to permit the pawl 84 to engage the teeth on the ratchet wheel 90 when the level drops to a point where the main hoist should be elevated. To this end, the pawl lift member 91 has a portion 96 which extends upwardly therefrom adjacent the pivot 94 and which is operated under the control of the pile height detecting means to raise and lower the pawl lift arm 91.

In the illustrated mechanism, the pile height detecting means is designated by the reference numeral 100 and is supported above the rear edge of the pile from which sheets are being separated by the separating suckers 11. As is shown in Fig. 1 and Fig. 11, the pile height detecting means comprises a detecting finger 101 which extends generally vertically and which is threaded into a support block 102 fixed to the end of a detecting arm 103 rockable on a shaft 104 extending transversely of the pile elevating mechanism and stationary during the operation of the elevating mechanism. The block 102 is angularly adjustable about an axis parallel to the shaft 104 and the detecting finger 101 may be threaded into or out of the block 102 to adjust the depending length of the finger.

The detecting arm 103 and, in turn, the detecting finger 101 is rocked toward engagement with the top rear edge of the pile from which sheets are being taken once during each cycle of operation, a cycle of operation occurring between the times each sheet is removed from the pile. The rocking of the detecting arm 103 is accomplished, in the illustrated embodiment, by means of a cam which is fixed to a continuously rotating cam shaft 105 is disposed immediately above the shaft 104 which supports the detecting arm 103 and having a cam 106 fixed thereto for rotation therewith. The cam 106 cooperates with a cam follower 107 fixed to a portion of the detecting arm 103 on the side of the shaft 104 remote from the detecting finger 101 to effect an oscillation of the detecting arm 103. The roller 107 is urged into engagement with the cam 106 by a spring 108 connected between the detecting arm 103 and a cam guard 110 fixed to a stationary shaft 111 above and parallel to the shafts 104, 105. The cam guard 110 also has portions 112 which function as a guard for the cam 106. When the cam 106 is rotated, the cam has a low portion 106a which allows the spring 108 to move the detecting arm 103 clockwise about the rockshaft 104, as the latter is viewed in Fig. 11 to move the detecting finger 101 downwardly toward engagement with the top of the pile. If the detecting finger 101 engages the top of the pile, the cam follower 107 will not follow the cam 106 and the rocking movement will stop until the high portion of the cam 106 lifts the detecting finger 102 from the pile when the high portion thereof engages the cam follower 107 to move the detecting arm 103 in a counterclockwise direction. If the height of the pile is such as to allow the cam follower 107 to follow the cam when it is riding toward the low portion, the arm 103 rocks an angular amount which is greater than when the level of the pile is such as to prevent the follower from following the cam 106.

When the detecting arm 103 rocks on its shaft 104, a detector rockshaft 113 extending parallel to the shaft 104 rearwardly and downwardly thereof is rotated or rocked an angular amount corresponding to the rocking of the detecting arm 103. The shaft 113 has an arm 114 keyed thereto and extending upwardly therefrom with the upper end of the arm being connected to the detecting arm 103 by a link 115 pivoted to the arm 114 and to the rocker member 103 on the axis of the cam follower 107. It can be seen, therefore, that the angular rotation of the shaft 113 is indicative of the height of the pile and the adjustment of the detector is such that when the shaft 113 rocks a predetermined angular amount, it is a signal that the pile height is too low.

Figure 2:
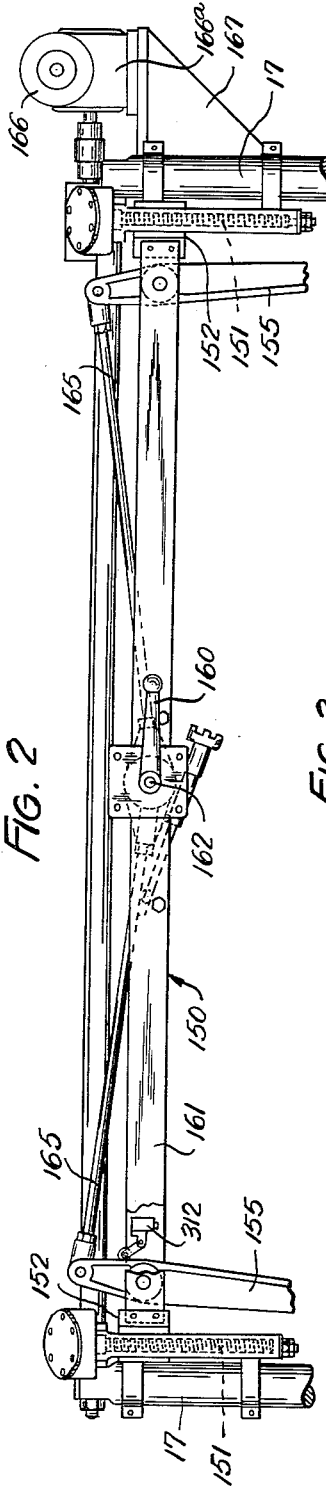
Fig. 2 is a fragmentary view looking at the rear of the elevating mechanism shown in Fig. 1 and from the right-hand side of the mechanism as it is viewed in Fig. 1.

The end of the shaft 113 adjacent the side frame 18 has fixed thereto an arm 117 which carries a roller 118 at its outer end that is engageable with a laterally extending flange 119 on a shaft 120 that extends parallel to the side frame member 18 and to the front column 15. When the shaft 113 is oscillated, the arm 117 moves downwardly to engage the flange 119 of the shaft 120 to effect a corresponding pivotal movement of the shaft 120. The angular movement of the shaft 120 controls the pawl lift member 91. The shaft 120 is connected to control the pawl lift member 91 so that when it oscillates counterclockwise, as viewed in Fig. 20 to a predetermined angular position, the pawl 84 is allowed to engage the ratchet wheel 90 and when it is oscillated in the opposite direction a predetermined amount from the position where the pawl is engageable, prevents engagement of the pawl 84 with the ratchet wheel 90. To this end, an arm 121 is fixed to the forward end of the shaft 120 and extends radially outwardly therefrom and inwardly of the elevating mechanism. A rod 122 is adjustably connected to the outer end of the arm 121 so as to move downwardly therewith and extends downwardly therefrom to effect the rocking of a vertical latch member 123 in accordance with the rocking of the shaft 120. The latch member 123 is pivoted for rocking movement about a pivot pin 124 and extends downwardly therefrom and has a rearwardly extending arm 125 which is connected to the rod 122 by a noddle pin connection 126. A set screw 126a adjustably fixes the noddle pin 126 to rod 122. A spring 126b is disposed about the rod 122 and engages the noddle pin and a frame member through which the lower end of the rod 122 freely slides. The spring 126b urges the rod 122 upwardly and, in turn, the latch member 123 in a counterclockwise direction, as viewed in Fig. 1, and shaft 120 in a clockwise direction as viewed in Fig. 2. The flange 119 on shaft 120 is therefore urged toward engagement with the roller 118 rocked by the detector shaft 113.

The latch member 123 is adapted to control the rocking movement of a bell-crank lever 127 which is rockable about a pivot connection 128 and is connected to reciprocate the pawl lift arm 91. (See Figs. 1 and 20.) The bell-crank lever 127 includes an arm 130 which extends downwardly to a position adjacent the upper end of the arm 96 of pawl lift member 91 and an arm 131 which extends forwardly from the pivot 128 to a position adjacent a cam 132 fixed to the crank shaft 82 for rotation therewith. It will be recalled that shaft 82 is a continuously rotating shaft. The cam 132 cooperates with a cam follower 133 fixed to the outer end of the arm 131 of the bell-crank lever 127 and is shaped to effect a rocking movement or a reciprocating movement of the bell-crank lever 127 for each rotation of the cam 132. The cam follower 133 is urged into engagement with the cam 132 by a tension spring 134 connected to the bell-crank lever 127 and the frame and which urges the bell-crank lever in a clockwise direction about its pivot to urge the cam follower 133 into engagement with the cam 132. If the cam follower 133 is prevented from moving or following the cam 132 when the low portion thereof approaches the cam follower 133, the pawl lift member 91 will be maintained in a raised position since the lift member 91 is lifted by the bell-crank lever when the cam follower 133 is riding on the high portion of the cam 132 and is lowered to permit engagement of the pawl 84 when the follower 133 is riding on the low portion of cam 132. The latch member 123 is pivoted above the arm 131 of the bell-crank lever 127 and when disposed in a vertical position engages a stop 131a on the arm 131 and prevents the arm 131 and the cam follower 133 thereon from following the cam 132 to maintain the pawl lift member in a lift position which keeps the pawl 84 from engaging with the ratchet wheel 90. If, however, the pile height level is detected to be too low, the latch member 123 is moved to a position out of engagement with the stop 131a, which allows the bell-crank lever 127 to be moved clockwise by the spring 134 under the control of cam 132. This in turn frees the lift arm 91 to move counterclockwise under the influence of gravity to allow the pawl 84 to engage the teeth on the ratchet wheel 90 to rotate the same and effect an incremental raising of the main hoist. It will be understood that the timing of the rocking of the lift member 91 under the control of cam 132 is such that the lift arm 92 is down before the pawl 84 is actuated in the driving portion of its reciprocatory movement.

Figure 6:
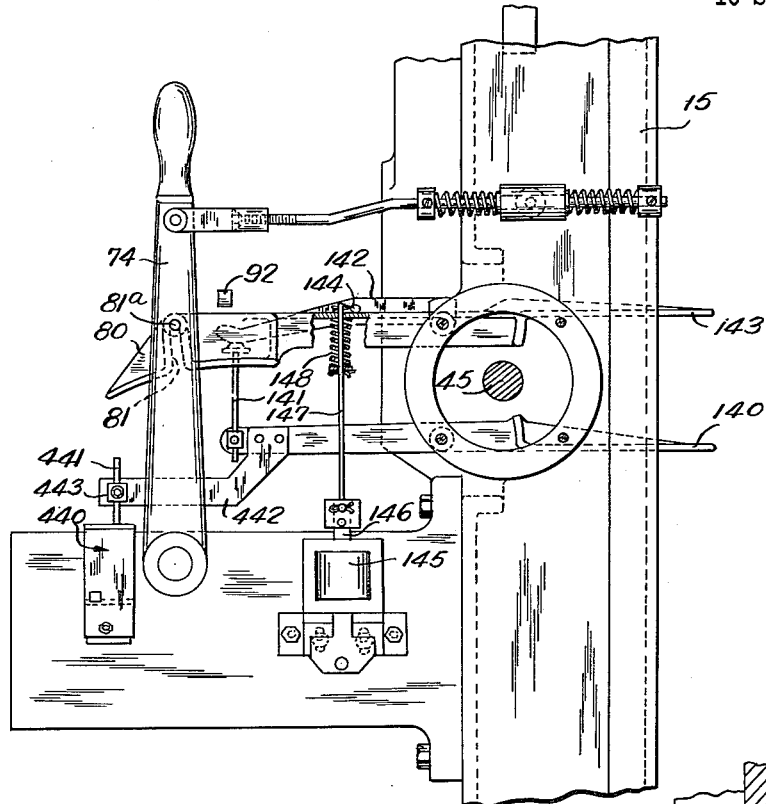
Fig. 6 is an enlarged fragmentary view of a portion of Fig. 5.
Figure 12:
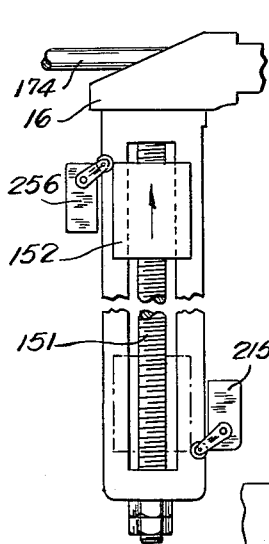
Figure 14:
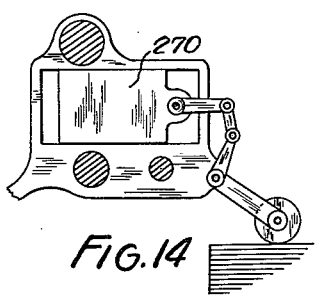

When it is desired to operate the main hoist manually or by the motor 51, the pawl or pawl lift member 91 should be operated to hold the pawl 84 out of engagement with the ratchet wheel 90. For this purpose, a manually operated lever 140 is provided adjacent the manually operated crank 46. The actuating lever 140 is pivoted to the column 15 and has one end adapted to be grasped by the operator and a portion which extends inwardly toward the ratchet wheel 90 and the inner end thereof has a push rod 141 extending upwardly therefrom which is adapted to engage a lever 142 pivoted to the column 15 on the same axis as the latch lever 80. The lever 142 extends inwardly and has a portion under the end of arm 92 of the pawl lift member 91 and lifts the latter when the lever 142 is actuated to a raised position, as shown in Fig. 6. The rod 141 slides through an opening in a lateral flange in latch lever 80 and is guided thereby.

The latch lever 80 which prevents operation of the clutch shifting lever 74 is, as mentioned above, pivoted to the column 15 and has a portion designated by the reference numeral 143 which may be grasped by the operator to lift the latch lever 80. The lever 142 is provided with a pin 144 which extends over the latch lever 80 so that when the latter is raised to release the clutch actuating lever 74, the lever 142 and, in turn, the pawl lift member 91 are raised to assure that the pawl 84 does not engage the ratchet wheel 90 while the main hoist is being raised or lowered by the motor 51, through the clutch mechanism.

In addition to the mechanism described above, a solenoid 145 is mounted below the latch lever and is energizable to effect a lifting of the latch lever 80 and lever 142. The solenoid 145 has an armature 146 which extends upwardly therefrom and which is raised when the solenoid is energized. The upper end of the armature 146 is connected to the latch lever 80 by a rod 147 pivoted on the armature and received in an opening in a flange on the latch lever. A spring 148 is disposed about the rod and abuts a shoulder or collar on the rod and the underside of the flange of the latch lever.

As is evident from the foregoing, the pile height detecting means is effective through the ratchet wheel 90 and the pawl 84 to intermittently effect an incremental raising of the main hoist to maintain the top of a pile supported thereon at the proper level for the suckers 11 to remove sheets therefrom. After the main hoist has been elevated a predetermined amount, preferably when approximately seven inches of remnant pile remains on the pallet, the pallet supporting the pile is transferred from the main hoist to an auxiliary hoist disposed above the main hoist and adapted to continue the intermittent elevation of the remnant pile to maintain the top thereof at feed level while a new pile is being brought into position on the main hoist. In the illustrated embodiment, the auxiliary hoist comprises a rectangular frame 150 supported above the main hoist by four lead screws 151. One of the lead screws 151 is disposed at each corner of the frame 150 and a nut 152 mounted on each corner of the rectangular frame threads onto the adjacent lead screw. Rotation of the lead screws 151 in one direction raises the frame 150, while rotation in the opposite direction lowers the frame 150.

The frame 150 has a pair of front arms 154 depending therefrom adjacent the opposite front sides of the frame and a pair of rear arms 155 depending therefrom adjacent the opposite sides of the frame at the rear of the mechanism. Each pair of front and rear arms adjacent the corresponding sides of the pile elevating mechanism is joined by a pallet supporting rail extending front to rear, with the pallet supporting rail adjacent the side frame member 18 being designated by the reference numeral 156, and the rail along the side of the press adjacent the side frame member 19 being designated by the reference numeral 157. The rails 156, 157 each have a plurality of rollers 156a, 157a mounted on the inner side thereof so as to extend inwardly therefrom in position to engage the underside of a pallet and support the latter on the auxiliary hoist. The arms 154, 155 are connected to the frame 150 for swinging movement toward and away from each other, i.e., the arms on one side of the frame 150 are swingable toward and away from the arms on the other side of the frame so that the arms may be sung to and from pallet-engaging position. A latch member 158 is mounted on a rod 163 carried by front and rear blocks 164 fixed to the rail 157. The rod 163 is axially slidable in the blocks 164 and the latch member is adjustable along the rod.

The arms 154, 155 may be swung to and from pallet-engaging position by the operation of a crank 160 supported on a rear transverse frame member 161 comprising spaced parallel plate members and constituting a part of the frame 150 and joining the nuts 152 at the rear end of the frame 150. The crank 160 is fixed to a shaft 162 which mounts a pair of eccentrics, not shown in detail, that have eccentric straps which are tied to the upper ends of the rear arms 155 by links 165. The eccentrics and their cooperating straps are not described in detail since the mechanism is disclosed in application Serial No. 735,446, filed by Norman W. Taylor on May 12, 1958, and per se form no part of the present invention. It should be noted, however, that the shaft 162 extends inwardly of the frame member 161 for purposes hereinafter explained in detail.

Figure 4:
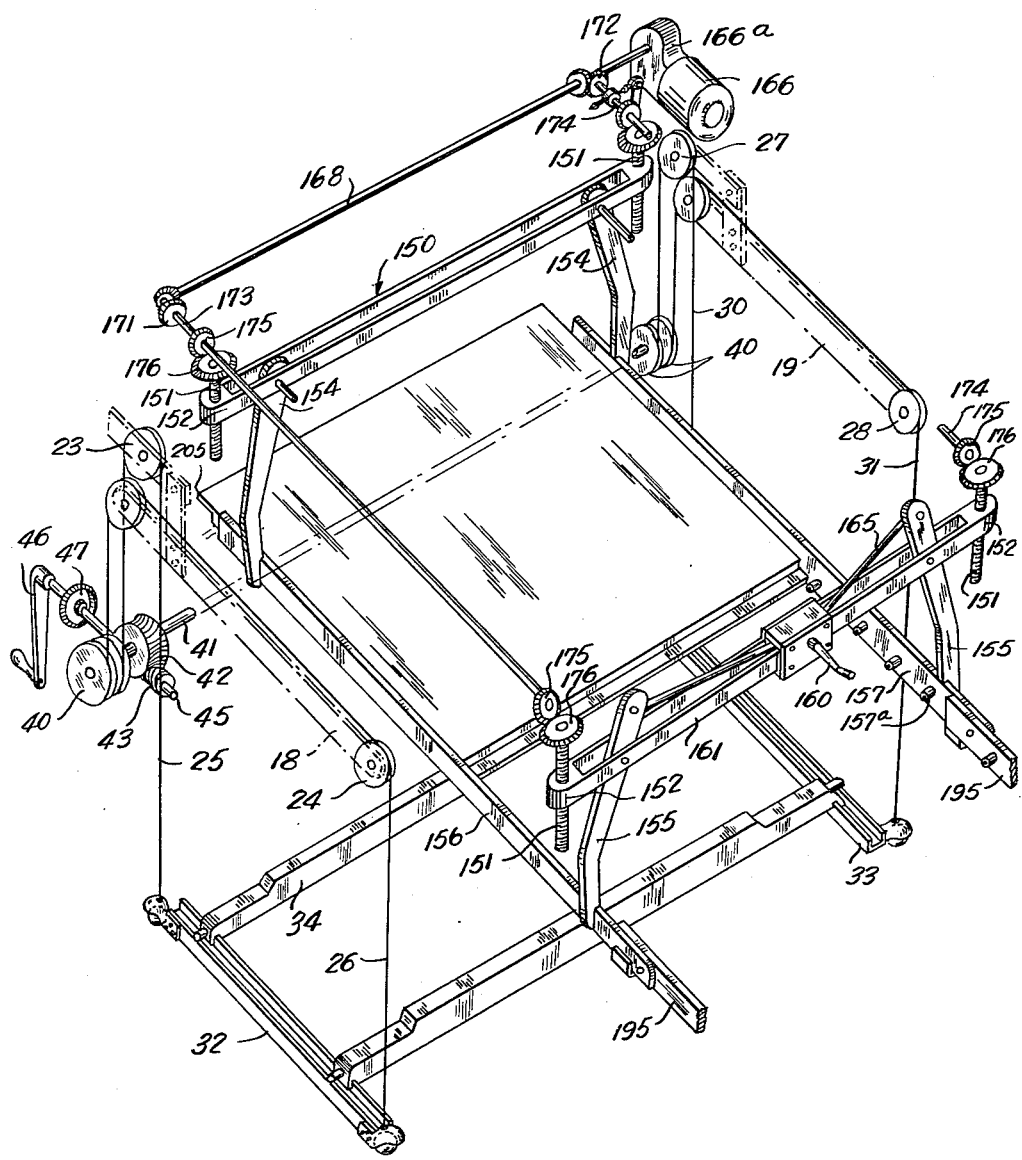
Fig. 4 is a diagrammatic view showing the hoists of the pile elevating mechanism of Fig. 1.

To raise and lower the frame 150 and the arms 154, 155, the screws 151 are rotated by a reversible motor 166 mounted on a bracket 167 supported by the front column 16. The motor 166 is connected by means of reduction gearing 166a to drive a shaft 168 extending across the elevating mechanism at the front thereof and having bevel gears thereon meshing with bevel gears 171, 172 fixed to shafts 173, 174, respectively, that extend along the opposite sides of the pile elevating mechanism with the shaft 173 extending along the near side of the mechanism, as viewed in Figs. 1 and 4. The shafts 173, 174 have bevel gears 175 fixed thereto which mate with respective ones of bevel gears 176 fixed to the lead screws 151 to effect rotation of the latter. It can now be seen that rotation of the motor 166 in one of the other of its directions will raise or lower the frame 150 depending upon the direction of rotation.

The auxiliary hoist is operated to take a pallet from the main hoist by lowering the auxiliary hoist with the arms swung out to a position where the rails 156, 157 are below the pallet, swinging in the arms to position the rollers 156a, 157a under the pallet, and then raising the auxiliary hoist to lift the pallet from the main hoist.

After the auxiliary hoist has been operated to take a pallet with a remnant pile of sheets thereon from the main hoist, the motor 166 is operated incrementally under the control of the pile height detector 100 to maintain the top of the remnant pile at the proper level for the suckers 11 to remove sheets therefrom. To this end, a switch 180 (see Fig. 20), is mounted adjacent the bell-crank lever 127. It will be recalled that the bell-crank lever 127 is reciprocated by the spring 134 and the cam 132 which is continuously rotated during the operation of the pile elevating mechanism when the pile height detecting mechanism detects a low level, the pile height detecting mechanism 100 operating through the latch 123 to release the bell-crank lever 127 for control by the spring 134 and cam 132. If the pile is low, the latch member 123, as described in describing the main hoist, is moved to allow the lever 127 to follow the cam 132. If the pile level is at or above the minimum to be maintained, the latch prevents the bell-crank lever 127 from following the cam 132 and the movement thereof is, therefore, indicative of the need for raising the top of the pile from which the sheets are being taken. The switch 180 has an actuator 180a engaged by the arm 130 of the bell-crank lever 127 to momentarily close the switch when the latch member 123 allows reciprocation thereof at the time the pile level is low. The switch is of the type which is closed momentarily by the movement of the arm 130 in its clockwise direction, to engage the actuator 180a as viewed in Fig. 20, but is not actuated by movement in the counterclockwise direction. The actuator 180a is a reciprocable rod spring-biased toward engagement with the arm 130, but the details of the switch and its actuator are not shown since it is commercially available and elevating mechanisms using such a switch are conventional.

The closing of the switch 180 will, only if a pile is on the auxiliary hoist, effect energization of the motor 166 to raise the auxiliary hoist. The rotation of the motor 166 to raise the auxiliary hoist will be stopped after the pile has been raised sufficiently to enable spring 126b to cause latch 123 to lock out the lever 127 and after the auxiliary hoist has been raised a predetermined incremental amount. The stopping of the motor is caused by the operation of a pair of dogs 181, 182 fixed to the opposite sides of the shaft 174 adjacent the front end thereof. The dogs 181, 182 are spaced 180° apart so that the ends are adapted to strike the actuator of a limit switch 183 mounted adjacent the shaft 174. As the shaft 174 is rotated, one of the dogs within 180° of revolution will momentarily actuate the switch 183 as it moves past its actuator. The switch 183 is connected into the motor circuit for the motor 166 to effect de-energization of the motor if the energization thereof has been effected by the momentary closing of the switch 180. Since the bell-crank lever 127 is reciprocated in each cycle when the pile is low, the motor may be repeatedly energized and de-energized by the combined operation of the switch 180 and the switch 183 until the auxiliary hoist is raised sufficiently to enable the latch member 123 to be moved into position to prevent the bell-crank lever 127 from reciprocating to close the switch 180.

The auxiliary hoist is placed under the control of the pile height detecting means and the pawl 84 lifted whenever the auxiliary hoist takes a pile from the main hoist and preferably remains under the control of the detecting means as long as a pallet is in supporting position on the auxiliary hoist. To this end, sensing or signalling means comprising a plurality of limit switches are provided on the rails 156, 157, there being a limit switch 190 on each rail adjacent the front end of the rail and a limit switch 191 adjacent the rear end of each rail for reasons which will appear hereinafter. The switches 190 are closed by a pallet on the auxiliary hoist when it is in normal pile-supporting position, and switches 191 are closed by the pallet when it is being withdrawn and while it is supporting only the rear edge of the remnant pile, as described hereinafter. The switches 190, 191 are connected into the control circuit for the motor 166 so that if either set is actuated, the switch 180 may be rendered effective to operate or energize the motor 166 and when neither set is actuated, the switch 180 is ineffective to effect energization of the motor 166.

After the auxiliary hoist has been elevated to a predetermined point where the pile thereon has only a relatively few number of sheets left and preferably when the pile is approximately 1½" high, the pallet supporting the pile on the auxiliary hoist is withdrawn in a first stage to deposit the majority of the remnant pile thereon onto the top of a new pile on the main hoist. To support the pallet as it is withdrawn from below the remnant pile, each of the rails 156, 157 is provided with an extension 195 which is connected to the rear end of the corresponding rails 156, 157 and swings between an operative position in alignment with the rail and a generally vertical inoperative position. Each rail 195 has a link 196 pivoted thereto adjacent its outer end, the link, in turn, being connected to the adjacent rear arm 155 by a link 197. The link 197 is pivoted to both the link 196 and the adjacent rear arm 155 and a stop member 198 is secured to the link 197 to engage the link 196 when the rail extension 195 has moved to its position in alignment with the corresponding one of the rails 156, 157 to prevent further downward movement of the extension.

For purposes which will be described hereinafter, it is desirable to sense the initial withdrawal of the pallet and, to this end, a limit switch 202 is fixed to the forward end of the rail 157 and has an actuating arm 203 which extends upwardly to be received in a recess 204 in the underside of the pallet. When the pallet is withdrawn, the actuator 203 rides out of the recess 204 to momentarily actuate the limit switch 202 to signal the initial withdrawal of the pallet.

When combining the pile on the auxiliary hoist with the pile on the main hoist, it is desirable to minimize the drop of the rear edge of the remnant pile as the pallet is withdrawn. This is because the suckers and the pile height detector operate on the rear edge of the pile and it is undesirable to have a drop such that the rear edge falls below the operating range for the suckers and the pile height detector. To enable the drop to be minimized, pallets have been provided with a step at the forward end thereof, as is shown in the drawings and as described in the aforementioned Royer application. The step comprises a thin portion 205 which extends along and outwardly of the front edge of the pallet and, when the pallet is withdrawn, the pallet is temporarily positioned with the portion 205 under the rear edge of the remnant pile and the main pile hoist operated to move the top of the pile thereon into the step and closer to the bottom of the rear edge of the remnant pile. The pallet then may be withdrawn and the remnant pile will only drop a distance approximately equal to the thickness of the narrow portion 205.

In accordance with one feature of the present invention, the rail 157 carries the latch member 158 engageable in a recess in the underside of the pallet when the pallet is withdrawn to the position where the main hoist is to be lifted or raised. The latch member 158 on the rail 157 engages in the same recess 204 when the pallet is the actuator 203 for the switch 202 when the pallet is fully disposed under the remnant pile. The latch member 158 is pivoted to a block 206 and is urged clockwise as shown in Figs. 7 and 8 about the pivot therefor by gravity aided by a spring 207 disposed under the left end of latch member 158 so that an upper portion 158a at the forward end thereof is urged upwardly into engagement with the underside of the pallet on the auxiliary hoist and toward movement into the recess 204. The upper forward portion 158a of the latch member forms an abutment which, when the recess 204 is moved to a position over the latch member, engages the forward side of the recess 204 which forms a cooperating abutment to prevent or arrest further withdrawal of the pallet. The block 206 is adjustably slidable along the rod 163 which extends along the underside of the rail 157 and which is supported for limited axial movement by the aforementioned front and rear blocks 164 disposed at the forward and rear ends of the bar 163 and fixed to the rail 157. The block 206 abuts an adjustable clamp collar 206a disposed rearwardly of the block. The bar 163 is normally urged forwardly by a spring 210 to move a collar 211 fixed thereto into engagement with the front block 164. The spring 210 is positioned between the front block 164 and a nut 210a fixed to the forward end of the rod 163. When the latch member 158 is engaged by the forward side of the recess 204, the force tending to withdraw the pallet and the momentum of the pallet cause the spring 210 to yield and permit limited rearward axial movement of the rod 163 to actuate a limit switch 170 mounted adjacent the rear end of rod 163 to signal that the latch member 158 has been received in the recess 204. The nut 210a is adjustable to provide proper preload in the spring 210 to both prevent friction from the underside of the pallet from urging the bar 163 rearwardly during withdrawal before the recess 204 comes into position, and also to prevent the two springs 210 from urging the pallet forwardly when only the thin portion 205 of the pallet is under the remnant pile.

After the latch member 158 is engaged, and the new pile has been raised into the step provided in the pallet, the main hoist or the auxiliary hoist is operated to relatively move the remnant pile and the new pile on the main hoist toward each other to lift the forward portion 205 of the pallet. The lifting of the pallet or of the forward edge of the pallet causes the pallet to clear the latch member 158, allowing the spring 210 to return the rod 163 and signal the necessity to complete withdrawal of the pallet.

Preferably, a latch member and limit switch corresponding to latch member 158 and switch 170 may be provided on rail 156 together with a rod corresponding to rod 163 and the biasing means therefor. While a corresponding latch member is not shown, a corresponding limit switch 170' is shown in the circuit diagram. While the pallet is in its partially withdrawn position, it keeps the rear limit switches 191 actuated to provide a sensing of the fact that the pallet is still below the remnant pile. When the pallet is withdrawn fully, it clears the switches 191 and the operation thereof signals that the piles have been combined and switches pile raising control by the pile height detecting means to the main hoist only. After the pallet is withdrawn and removed from the rails 156, 157 and the extensions 195 thereof, the extensions are folded to their generally vertical position and a limit switch 208 is actuated by the swinging movement of the link 196 to signal that the arms 154, 155 should be swung out. The limit switch 208 is mounted adjacent the underside of the extension 195 of the rail 157 and is operated by a dog 209 secured to the end of link 196.

After the pallet has been withdrawn, the crank 160 is operated to swing out the arms 154, 155 of the auxiliary hoist. The shaft 162 of the crank 160 has switch actuating dogs 160a, 160b on its inner end and when the crank is operated, the dogs are adapted to actuate limit switches 212, 213 mounted on the frame member 161 adjacent the inner end of shaft 162 (see Fig. 13). The limit switches 212, 213 have actuators 212a, 213a, respectively, which, when operated in one direction by the passing of one of the dogs 160a, 160b, effect a momentary actuation of the switch, but when operated in the other direction, do not effect operation of the switch. The switches and actuators therefor are of a conventional commercially available type and therefore are not shown or described in detail. The switch 212 is set up so that the switch is momentarily actuated by the dog 160a when the crank 160 is rotated in a direction to swing the arms out. When the switch 212 is actuated momentarily, the auxiliary hoist motor 166 is operated to move the hoist downwardly in a continuous manner to a lower limit position where the hoist is adapted to take the next pallet to be elevated thereby from the main hoist. The downward movement of the auxiliary hoist is stopped when it reaches the desired lower limit by a limit switch 215 (Fig. 12) mounted adjacent the lower end of the front lead screw 151 adjacent the right-hand side of the pile elevating mechanism, as the latter is viewed in Fig. 3.

The limit switch 213 operated by the rotation of the crank 160 is set up so that the switch is momentarily actuated to a closed position by the dog 160b on the rotation of the crank in the direction necessary to swing in the arms. The actuation of the switch 212 causes the motor 166 to be energized to move the frame 150 upwardly at a continuous rate until the pallet is taken by the auxiliary hoist and the limit switches 190 or 191 are actuated. When one set of these switches is actuated, the continuous upward movement of the auxiliary hoist is stopped and, as described hereinbefore, the auxiliary hoist is placed under the control of the pile height detecting means.

The main hoist actuates a limit switch 216 (Fig. 15) to signal when the arms of the auxiliary hoist should be swung in to take a pallet from the main hoist. The limit switch 216 is supported on the front column 15 and is engaged by a vertical plate 217 fixed to the longitudinal rail 32 of the main hoist so as to move upwardly and downwardly therewith. Preferably, the limit switch 216 is actuated when the main hoist has been elevated to a position indicating that approximately seven inches of sheet pile remain thereon. The upward movement of the main hoist is limited by limit switches 218, there being such a limit switch mounted on each of the front columns 15, 16 in position to be actuated by the plate 217 on the longitudinal rail 32 and a plate 217a on the longitudinal rail 33. (See Fig. 3.)

In accordance with the preferred embodiment of the present invention, the operation of the pile elevating mechanism is facilitated and simplified by a control panel which includes signals for performing certain operations at the proper time. The control panel is designated by the reference numeral 220 and is mounted on the cover of the elevating mechanism at the rear side thereof. (See Figs. 1 and 18.) The control panel 220 includes a signal block 221 having a light 222 (Fig. 19a) therein which is energized when the arms of the auxiliary hoist are to be swung in to pallet-engaging position. The energization of the lamp 222 is controlled by the limit switch 216. Immediately below the block 221 on the control panel is a block 224 which indicates that the main hoist should be lowered when a lamp 225 therein is energized. The lamp 225 may be energized after the auxiliary hoist has taken the pallet from the main hoist and the energization of the lamp 225 is controlled by a limit switch 226 (Fig. 16) mounted on the front arm 154 of the auxiliary hoist on the left-hand side of the elevating mechanism, as viewed in Fig. 3, and by the limit switch 216 which is actuated by the main hoist when the pile thereon is to be taken by the auxiliary hoist. The limit switch 226 is a safety switch and is actuated by the pallet on the auxiliary hoist if the main hoist, with a pile thereon, is elevated so that it engages the pallet and lifts the same from the auxiliary hoist. If this happens, the limit switch 226 is operated and the "Lower Main Hoist" signal 224 energized. Immediately below the main hoist block is a "Pull Pallet" block 228 which includes a lamp 229 which, when energized, indicates that the pallet should be pulled. The "Pull Pallet" lamp 229 is energized under the control of a limit switch 231 disposed adjacent the lead screw 151 at the front left-hand corner of the auxiliary hoist, as the latter is viewed in Fig. 3. The limit switch 231 is actuated by the nut that cooperates with the adjacent lead screw when the nut has been elevated to a predetermined position. A block 233 is disposed immediately below the block 228 and is illuminated to indicate that the pallet on the auxiliary hoist has been withdrawn to a position where its thin forward portion 205 thereof is disposed under the rear edge of the remnant pile and that the hoists are to be operated to relatively move the hoists to lift the pallet from the latch members 158 prior to completing withdrawal of the pallet. The energization of the amp 234 is controlled by the limit switches 170 and 170' responsive to the operation of the latch members for engaging the pallet. A legend block 236 is disposed on the main control panel 220 immediately below the legend block 233 and has a lamp 237 which is energized to indicate that the arms of the auxiliary hoist are to be swung out. The energization of lamp 237 is controlled by the limit switch 208 actuated by the raising of the rail extensions 195.

In addition to the above legend blocks, the control panel 220 includes "Raise" and "Lower" start buttons 238, 239, respectively, for the motor 166 and "Stop" button 240 for stopping the operation of the auxiliary hoist motor and a "Synchronize" push button switch 242 which is actuatable to render the pile height detecting means effective to control both the main and auxiliary hoists and a lamp 243 to indicate that both hoists are under the control of the detecting means, which may be termed "synchronization." The panel also includes "Power-On" and "Power-Off" push button switches 244a, 244b for controlling the connection of the control circuit to the mains and a lamp 244c indicating when control power is on.

The controls for the auxiliary hoist may be best understood by reference to the circuit diagram of Figs. 19, 19a. The "Power-On" push button switch 244a (see Figs. 19, 19a), when depressed, effects energization of a "Power" relay coil 245 by connecting one side thereof to an L1 terminal of the secondary of a supply transformer having terminals labeled L1, L2. The other side of the relay coil 245 is connected directly to L2. The connection of the relay coil 245 to L1 is through the normally closed contacts of "Power-Off" push button switch 244b. The energization of "Power" relay coil 245 closes its normally open contacts 245a, 245b and opens its normally closed contacts 245c. The contacts 245a complete a holding circuit across "Power-On" switch 244a and the closing of contacts 245b connects a line, hereinafter designated as L1c, to the terminal L1 of the transformer to supply power to the control circuit. It will be noted that the control power is killed and the "Power" relay coil 245 de-energized if "Power-Off" push button switch 244b is operated.

When the "Raise" push button switch 238 is actuated, it closes two sets of normally open contacts 246a, 246b. The closing of the contacts 246a completes the circuit for energizing an "up" relay coil 247. When the "lower" push button switch 239 is actuated, it closes normally open contacts 248 to effect energization of a "down" relay coil 250. The relay coils 247, 250 actuate contacts 247a and 250a, respectively, in the phases for energizing the motor 166 and, when closed, effect energization of the motor to cause it to rotate in different directions. In addition to the contacts 247a, 250a, the "up" relay coil 247 also has normally closed, interlocking contacts 247b in the circuit for energizing "down" relay 250 and normally open contacts 247c for making a holding circuit across "Raise" push button switch 238, and the "down" relay coil 250 has normally closed, interlocking contacts 250b in the circuit for energizing the "up" relay 247 and normally open contacts 250c which make a holding circuit across the "Lower" push button switch 239. When the "Raise" push button switch 238 is depressed, the contacts 246a thereof connect one side of the "up" relay coil 247 to L1c through a circuit which comprises the normally closed contacts of "Stop" push button switch 240, one of the normally closed contacts of switch 240 being connected to L1c and the other being connected to one of the contacts 246a of "Raise" push button switch 238 by a connection 252, and the other contact of the contacts 246a being connected to the "up" relay coil 247 through a connection which includes, in series, the intermittent switch 183, which is normally closed, and the interlocking contacts 250b of the "down" relay coil 250. The other side of the "up" relay coil 247 is connected to L2 by a connection 253 which includes the normally closed contacts 254a of a relay coil 254, and a normally closed upper limit switch 256. (See Fig. 12.) When the "up" relay coil 247 is energized, its contacts 247c complete a holding circuit about the "Raise" push button switch 238 as mentioned above. The "up" relay coil 247 will be maintained energized until either the intermittent limit switch 183, the high limit switch 256, the stop push button 240, or one of the interlocking contacts in the circuit is opened. It will be noted that a normally closed parallel circuit 257 is connected across the intermittent limit switch 183 and includes normally closed contacts 260a actuated by a "swing-in" relay coil 260 and normally closed contacts 261a actuated by a "change-over" relay coil 261. The contacts 260a, 261a are normally closed, i.e., the relay coils 260, 261 are normally de-energized, when a pallet is not present on the auxiliary hoist, or the arms 154, 155 are not being swung in to take a pallet. Therefore, as long as a pallet is not on the auxiliary hoist or the auxiliary hoist arms are not being operated to take a pallet from the main hoist, the operation of intermittent limit switch 183 will not affect the energization of "up" relay coil 247.

The energization of the "swing-in" relay coil 260 by the momentary closing of the switch 213 as the arms of the auxiliary hoist are swung in also sets up a circuit to effect a raising of the auxiliary hoist to lift a pallet from the main hoist and to place the auxiliary hoist under the control of the pile height detector 100, when the pallet is lifted by the auxiliary hoist as signalled by the actuation of the limit switches 190 and the energization of "change-over" relay coil 261.

The momentary energization of "swing-in" relay coil 260 closes normally open contacts 260b, and in addition momentarily opens and again closes contacts 260a, previously mentioned, for effecting the energization of a relay coil 263 from L1c, the relay coil 263 actuating normally open contacts 263a, which, when closed, complete a circuit across the contacts of "Raise" push button switch 238 and effect energization of "up" relay 247. The circuit for energizing the relay coil 263 includes normally closed contacts 265a on the L2 side of contacts 260b actuated by a time-delay relay coil 265. The time-delay relay coil 265 is connected across its contacts 265a and the relay coil 265 is energized whenever relay 263 is energized and operates after a predetermined time delay of approximately one-half second to open the circuit for energizing relay coil 263 from L1c. It can be seen from the above, that as the arms of the auxiliary hoist are swung in, the relay coils 260 and 263 will operate to energize the "up" relay coil 247 to energize motor 166. When the "up" relay coil is energized, it will complete a self-holding circuit through its contacts 247c so that it will not be de-energized when the relay coil 263 is de-energized, and the auxiliary hoist will raise until the circuit for energizing coil 247 is broken. If, for some reason, the arms 154, 155 are stopped in a position which maintains the switch 213 closed, the time-delay relay coil 265 will operate to de-energize the relay coil 263 to prevent repeated operation of the motor 166. While the intermittent switch 183 would be effective to de-energize the "up" relay in this condition, since the contacts 260a in the parallel connection 257 across the switch will also be open, the "up" relay coil could be again energized by pushing "raise" button 238 to close 246a and 246b to by-pass the circuits through switch 183 and lead 257. Under such condition, the auxiliary hoist can raise until switch 183 next opens after button 238 is released.

The "up" relay under normal conditions of transferring a pallet from the main to the auxiliary hoist will remain energized until the pallet closes both "pallet-sensing" switches 190 carried by the rails 156, 157. Each of the switches 190 has one of the switches 191 connected in parallel therewith and switches 190 are connected in series to complete a circuit when both are closed between L1c and one side of the "change-over" relay coil 261. The other side of the relay coil 261 is connected directly to L2.

The energization of change-over relay coil 261 opens the normally closed contacts 261a in the parallel connection 257 to render the intermittent switch 183 effective to de-energize the "up" relay coil 247 when operated by one of the dogs 181, 182 to stop the raising of the auxiliary hoist. It can be seen, therefore, that when the arms 154, 155 are swung in, the auxiliary hoist will raise until the pallet-sensing switches 190 are actuated to render intermittent switch 183 effective to de-energize "up" relay coil 247.

The "change-over" relay coil 261 also actuates normally open contacts 261b connected in a series connection with the pile height detector switch 180 and across the contacts 260b so that when both the contacts 261b and the pile height detector switch 180 are closed, the relay coil 263 and time-delay relay coil 265 are energized from L1c to effect energization of the "up" relay coil 247. During normal operation, the "up" relay coil will remain energized until the intermittent switch 183 effects its de-energization, as described above. It can now be seen that when a pallet is on the auxiliary hoist, the momentary closing of switch 180 will effect an incremental raising of the auxiliary hoist. Since the bell-crank lever 127 (Fig. 20) for operating switch 180 is capable of being reciprocated once in each cycle when the pile is low, the closing of the switch 180 is only momentary and it is opened in each cycle to de-energize relay coil 263 and if the pile is still low in the next cycle switch 180 will again close to again effect another incremental raising of the auxiliary hoist.

The relay coil 254 is a limit relay coil and has, as mentioned hereinbefore, normally closed, interlocking contacts in the circuit for energizing "up" relay coil 247, the contacts being connected between the relay and L2. The "limit" relay coil 254 is energized in the event that the height of the pile raises above a maximum level. If this occurs, the top of the pile actuates a limit switch 270 (see Fig. 13) having normally open contacts to connect one side of the relay coil 254 to L1c and to effect energization of the latter to open the contacts 254a in the circuit for energizing the "up" relay 247. Similarly, it will be noted that if the auxiliary hoist reaches its upper limit, it will operate limit switch 256 (see Fig. 12) to also effect a de-energization of the "up" relay coil.

It will be noted that time delay contacts 265a will prevent repeated energization and de-energization of the motor 166 in the event the switch 180 is maintained closed.

Preferably, the "Raise" push button switch 238 has its contacts 246b connected to complete a circuit across the intermittent limit switch 183 and the parallel connection 257 so that the hoist can be raised under the control of the operator even though the change-over relay coil 261 is energized by the presence of a pallet on the auxiliary hoist and the intermittent switch 183 is open. To this end, the L2 side of the contacts 246a of the "Raise" switch 238 is connected to one of the contacts 246b and the other of the contacts 246b is connected to the intermittent switch 183 on the L2 side thereof. It can be seen that, whenever the push button switch 238 is depressed, a circuit will be completed to energize "up" relay coil 247 regardless of the condition of switch 183 or the parallel connection 257. After the "up" relay coil is energized, it will be apparent that the holding contacts 247c thereof will hold the circuit even though the limit switch 183 or its parallel connection 257 is open, as long as the push button switch 238 is held closed.

The above description has set out the control for the auxiliary hoist motor when it is desired to elevate the motor by depressing the push button switch 238 and when the motor is under the control of the pile height detecting means. The auxiliary hoist, however, may be lowered at any time, regardless of whether it is under the control of the pile height detecting means, by pushing the "Stop" switch 240 and then the "Lower" push button switch 239. As stated hereinbefore, the depression of this switch completes a circuit for energizing the "down" relay coil 250 and will effect energization of the "down" relay coil only if the "up" relay coil is de-energized, since the circuit for energizing the relay coil 250 includes interlocking, normally closed contacts 247b actuated by "up" relay coil 247. The circuit for energizing the "down" relay 250 may be traced on the circuit diagram from L1c through "Stop" push button switch 240, the connection 252, a connection 281 to one of the contacts of the push button switch 239 and a connection 282 from the other contact of the switch 239 to the L1 side of the relay coil 250 and from the other side of the relay coil to L2 through a connection including the lower limit switch 215. The energization of the "down" relay coil 250 closes its normally open contacts 250c in a parallel connection 284 about the push button switch 239 to provide a self-holding circuit which can be broken by opening lower limit switch 215 (see Fig. 12), or contacts 285a actuated with a time delay by a relay coil 285 and connected in series with contacts 250c in the connection 284. The time-delay relay coil 285 is energized to break the holding circuit through parallel connection 284 in a manner described hereinafter. The limit switch 212 (Fig. 13) is closed momentarily as the arms 154, 155 of the auxiliary hoist are swung out to initiate movement of the auxiliary hoist downwardly to its lower limit position determined by the position of the lower-limit switch 215. When the limit switch 212 is closed, it completes a circuit from L1c through the limit switch 212 to energize a "swung-out" relay coil 287. The relay coil 287 actuates normally open contacts 287a and normally closed contacts 287b. The normally open contacts 287a are connected in parallel across the "down" push button switch 239 and the parallel connection 284 and, when closed, connect the "down" relay coil 250 to L1c through the "Stop" push button switch 240.

The "down" relay 250 for the auxiliary hoist may also be energized by the closing of contacts 290a actuated by a relay coil 290 which is connected in parallel with the relay coil 285. The relays 285 and 290 will be explained in more detail hereinafter.

The energization of the change-over relay coil 261 upon the taking of a pallet by the auxiliary hoist not only places the auxiliary hoist motor 166 under the control of the pile height detector, as described above, but also sets up circuits for controlling and indicating various operations which take place during the change-over from the main hoist to the auxiliary hoist and during the later combining of the piles on the auxiliary and main hoist. When the pallet is taken by the auxiliary hoist and the change-over relay coil 261 is energized, it closes contacts 261c in a connection 291 connected to L1c to connect L1c to a connection 292 which is connected through a connection 293 to one side of the solenoid 145 (Fig. 6) for lifting the pawl 84 clear of the ratchet wheel 90 to remove the main hoist from the control of the pile height detector. The connection 293 to the solenoid 145 includes normally open contacts 295a actuated by a relay coil 295 which is energized on the closing of the contacts 261c of the change-over relay coil 261. The relay coil 295 is connected to the connection 291, including the contacts 261c of the change-over relay coil, and then to L1c by a circuit which includes the normally closed contacts 297 of the "Synchronize" push button switch 242 connected in series with normally open contacts 298a actuated by a relay coil 298, having normally open contacts 295b being connected in parallel with contacts 298a. The normally open contacts 298a are closed to energize relay coil 295 and, in turn, solenoid 145 when the relay coil 298 is energized, the latter coil being energized by the closing of the change-over relay contacts 261c through a circuit which includes normally closed contacts 299a actuated with a time delay by a relay coil 299. The relay coil 298 is, therefore, normally energized as soon as connection 292 is connected to L1c. The circuit for energizing relay coil 298 from the time delay contacts 299a comprises a connection 301 which includes the normally closed contacts 302a of a relay coil 302. The relay coil 299, as stated above, is a time-delay relay and the circuit for energizing the relay coil 298 through the contacts 299a is broken a predetermined time after it is made by the operation of the time-delay relay coil 299 and which is energized simultaneously with the relay coil 298 upon closing of the contacts 261c. Summarizing, the energization of relay coil 298 closes its normally open contacts 298a in the circuit for energizing relay coil 295 and the energization of relay coil 295 closes its normally open contacts 295a in the circuit for energizing the solenoid 145 to lift the pawl clear of the ratchet wheel 90 and to release the latch lever 80.

When the relay coil 295 is energized to energize solenoid 145, it closes its holding contacts 295b to complete a self-holding circuit about the contacts 298a of the relay coil 298. The energization of the relay coil 295 also closes normally open contacts 295c in the energizing circuit for a relay coil 302. The contacts 295c and the relay coil 302 are series connected across the time-delay relay 299 and when the relay coil 295 operates it closes the contacts 295c to effect energization of the relay coil 302 from connection 292. The operation of relay coil 302 opens its normally closed contacts 302a in the circuit for the relay coil 298 to de-energize the latter and open its contacts 298a, 298b. The contacts 298a are in the circuit for energizing the coil 295, while the contacts 298b are connected in parallel with the time-delay contacts 299a of the relay 299. The contacts 298b will assure that the opening of the contacts 299a does not de-energize relay coil 298 before relay coil 295 is energized to lift the pawl 84. If the contacts 299a were opened before the relay coil 298 were energized to close its contacts to energize the relay coil 295 to, in turn, close contacts to energize the solenoid 145, the sequence of operations would not occur and the pawl would not be lifted.

In the preferred and illustrated mechanism, an alarm sounds and a light is illuminated, either continuously or in an intermittent manner, under each of the conditions when the arms of the auxiliary hoist are to be swung in to take the pallet from the main hoist, when the pallet is to be initially withdrawn to its position where the thin portion 205 thereof is disposed under the rear edge of the pile, when the pallet is lifted clear of the latch members upon relative movement between the hoists and the pallet is to be completely withdrawn from the auxiliary hoist, and when the arms of the auxiliary hoist are to be swung out after the withdrawal of the pallet.

Figure 15:
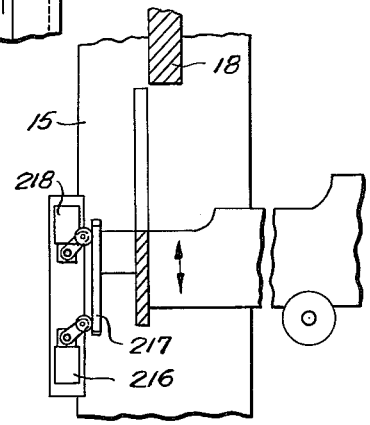
Figure 13:
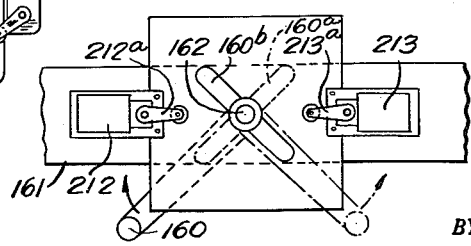

When the main hoist reaches a predetermined elevation, it actuates switch 216 (Fig. 15). The limit switch 216 is a normally open switch and, when actuated, closes its contacts to energize a relay coil 308 for actuating normally open contacts 308a, 308b which are closed when the relay coil is energized. The closing of the contacts 308a completes a circuit from L1c for energizing a relay 310. The contacts 308a are connected in series with a switch 312 (Fig. 2) mounted on the auxiliary hoist frame 150 and engaged by one of the arms 154, 155 thereof and actuated to a closed position when the arms are swung out, and opened as the arms are swung in. When the main hoist reaches a position where the pallet is to be taken therefrom, the arms of the auxiliary hoist are in their out position and the limit switch 312 is closed so that the relay 310 will be energized when the contacts 308a are closed. Energization of the relay 310 closes normally open contacts 310a which completes a circuit from L1c to energize a flasher relay coil 315 and an alarm 313 and a lamp 314 through contacts 315a of flasher relay coil 315 and its contacts 310b to energize lamp 222 in the control panel 220. The flasher contacts 315a make and break when the coil and contacts are energized and the alarm and lamp will operate intermittently. The relay 310 will keep the alarm 313 sounding and the lamp 314 flashing intermittently until the arms are swung in and the switch 312 is opened to drop out relay coil 310. After the arms have been swung in, the relay coil 263 will operate to effect a continuous "up" movement of the auxiliary hoist in the manner described above and the movement will be stopped when the hoist has taken the pallet from the main hoist. As hereinbefore mentioned, when this happens, the closing of the front switches 190 on the rails 156, 157 will effect an energization of the change-over relay 261.

After the pallet is taken by the auxiliary hoist, light 225 in the control panel 220 will be energized to indicate that the main hoist should be lowered. The light 225 is energized by the energization of a relay coil 318 having contacts 318a connecting the light 225 to L1c. One side of relay coil 318 is connected to L2 and the other side to L1c by a connection which includes the normally open contacts 308b actuated by the relay coil 308 and normally open contacts 261d actuated by the relay coil 261. As will be recalled, the taking of the pallet by the auxiliary hoist effects an energization of the change-over relay coil 261 to close its normally open contacts, and the limit switch 216 (Fig. 15) which is actuated when the main hoist reaches the position for taking the pallet therefrom effects the energization of the relay coil 308 to effect the closing of its contacts 308b. Therefore, when the main hoist takes the pallet, the relay coil 318 is energized to close its contacts 318a to connect the light 225 across L1c and L2 to indicate that the main hoist should be lowered and a new pile brought into position and its contacts 318b a new pile brought into position and its contacts 318b to energize flasher relay 315 and alarm 313 to L1c. As soon as the main hoist is lowered sufficiently to open the limit switch 216, the relay coil 308 and, in turn, the relay coil 318 will be de-energized to open the contacts 318a, extinguishing the light 225, the alarm 313, and the flasher lamp 314.

After the main hoist is lowered and a new pile brought into position thereon, the main hoist is elevated to position the top of the new pile immediately below the bottom of the pallet on the auxiliary hoist, preparatory to combining the piles when the remnant pile on the auxiliary hoist is depleted to a predetermined level. After the new pile has been properly positioned with its top immediately below but not touching the pallet on the auxiliary hoist, it is desirable to operate both hoists under the control of the pile height detector, or in synchronism with each other, until the pile on the auxiliary hoist is depleted sufficiently to where the piles on the main and auxiliary hoists are to be combined. The hoists may be synchronized so that the pile height detecting means will effect incremental operation of both by depressing the "Synchronize" push button 242. When the "Synchronize" push button switch 242 is actuated, it opens its contacts 297 to de-energize the relay coil 295. It will be recalled that the relay coil 295 was energized by the taking of the pallet by the auxiliary hoist to effect energization of the solenoid 145 for lifting the pawl 84 clear of the ratchet wheel 90. When the circuit to the relay coil 295 is broken, the solenoid 145 is de-energized and the pawl 84 is then placed under the control of the pile height detector, as described above, and the pawl is operated to raise the main hoist in increments together with the auxiliary hoist. The actuation of the "Synchronize" switch 242 to break the circuit for energizing relay 295 also closes its normally open contacts 320 which complete a circuit from L1c through the now closed, normally open contacts 261d of the relay coil 261 to energize a relay coil 322 having normally open contacts 322a and 322b. The normally open contacts 322a complete a holding circuit for holding the relay 322 energized and are connected in parallel with the contacts 320 of the "Synchronize" switch 242 and the contacts 322b complete a circuit for connecting the lamp 243 across L1, L2. The lamp 243 indicates that the hoists have been synchronized and that the pile height detector will effect an incremental operation of both hoists when it detects a low pile level.

When the pile on the pallet on the auxiliary hoist is depleted to preferably approximately 1½ inches, the limit switch 231 (Fig. 3) will be actuated by the auxiliary hoist. The closing of the limit switch 231, completes a circuit for energizing a relay coil 325 from L1 through a circuit including the now closed contacts 261d of the energized change-over relay 261, normally closed contacts 326a actuated by a relay coil 326 and in a connection 327, the now closed contacts of limit switch 231, and a connection 328 including the normally closed contacts 330a which are actuated by a relay coil 330. The energization of the relay coil 325 upon closing of the limit switch 231 closes its normally open contacts 325a, 325b. The normally open contacts 325a are holding contacts which complete a holding circuit across the limit switch 231 and the contacts 330a of relay coil 330, while the contacts 325b are in a circuit for energizing a relay coil 322 and when closed, connect one side of the relay coil 322 to L1c through the connection 327, including normally closed contacts 326a and the now closed contacts 261d of change-over relay coil 261. The energization of the relay coil 332 closes contacts 332a and 332b. The contacts 332a are in a circuit for connecting the L1 side of the alarm 313 and the lamp 314 to L1c independently of the flasher contact 315a and when closed, effect a continuous energization of the alarm 313 and the lamp 314.

The contacts 332b of the relay coil 332, energized as just described, effect, when closed, energization of the lamp 229 indicating that the pallet should be pulled and are connected in a circuit in series with normally closed contacts 326d of the relay coil 326. Therefore, with the relay coil 326 de-energized, the normal condition of the relay, the energization of the relay 332b illuminates the pull pallet lamp 229.

When the pallet is pulled to a position where only the thin portion 205 thereof is disposed under the rear edge of the remnant pile on the auxiliary hoist, the latch members 158 engage and close the limit switches 170, 170'. Before, however, the limit switches 170, 170' are actuated, the initial withdrawal of the pallet momentarily closes the limit switch 202 disposed adjacent the front end of the rail 157 to signal the initial withdrawal of the pallet. The closing of the limit switch 202 energizes a relay coil 336 having normally open contacts 336a, 336b and 336c. The contacts 336a are connected in parallel with the series circuit comprising contacts 325a and the switch 231 actuated by the main hoist when it reaches the level for pallet removal to maintain the alarm and lamp 314 energized continuously when the circuit through the limit switch 231 is broken. Or, if the pallet is withdrawn prior to the main hoist reaching its proper height, the contacts 336a will effect the energization of the relay 325 and, in turn, the relay 332 to close the contacts 332a and to sound the alarm 313 continuously. The circuit through limit switch 231 is broken by the closing of the contacts 336b upon operation of switch 202 since these contacts are connected into a circuit for energizing the relay coil 330 from L1c through the normally open contacts 261d of the change-over relay 261. The relay coil 330, when energized, opens its normally closed contacts 330a in series with the switch 231 in the circuit for energizing the relay 325. The closing of the normally open contacts 330b of the relay coil 330 effects a holding circuit for the relay 330 around the contacts 336b so that relay coil 336 can be de-energized without affecting relay coil 330.

When the pallet is withdrawn sufficiently to engage the pallet latch members 158, the limit switches 170, 170' are closed to effect energization of the relay coil 326 from L1c through the now closed, normally open contacts 261d of the change-over relay 261. The energization of the relay coil 326 opens its normally closed contacts 326a to de-energize the relay coils 325 which have been operating through relay coil 332 and its contacts 332b to maintain the "Pull Pallet" light 229, the alarm 313, and the light 314 continuously energized. In addition to the contacts 326a, the relay coil 326 has contacts 326b which are normally closed in the circuit for energizing the "Pull Pallet" light and these contacts are also opened to de-energize the "Pull Pallet" lamp.

The relay coil 326 also actuates contacts 326c which are closed when the coil is energized to energize a relay 338 from L1c through the now closed, normally open contacts 261d of the change-over relay 261. The relay coil 338 has normally open contacts 338a which make a self-holding circuit about the contacts 326c, and normally open contacts 338b which are connected in parallel with the contacts 332a for completing a circuit for maintaining the alarm 313 and the light 314 in a continuously energized condition while the remainder of the combining operation is taking place, it being recalled that the relay 332 is de-energized by the opening of the contacts 326a. The relay coil 338 also actuates normally open contacts 338c connected in parallel with the contacts 332b in the circuit for energizing the "Pull Pallet" lamp 229 so that the lamp will again be energized upon the de-energization of relay coil 326 when the latch switches 170, 170' are opened and remain energized as long as the relay coil 338 remains energized. If it were not for the contacts 338c, the light would go out when the relay 326 is de-energized upon the release of the latch members 158 and the opening of the switches 170, 170'.

The relay coil 326 which was energized by the engagement of the pallet with the latch members also actuates contacts 326d in a connection for energizing the lamp 234 which indicates that the main hoist should be raised or the auxiliary hoist lowered to combine the piles. The closing of the contacts 326d effects the energization of this light. When the lamp 234 is illuminated, the main hoist is raised until the rear of the new pile engages portion 205 of the pallet, and may be raised additionally or the auxiliary hoist may be lowered until the top of the pile on the main hoist lifts the pallet clear of the latch members 158, extinguishing lamp 234.

It will be noted that with the latch members 158 engaged and switches 170, 170' closed, and relay coil 326 energized, contacts 326g in the circuit for energizing relay coil 290 and time-delay relay coil 285 are closed so that when the "Lower" push button switch 239 is actuated, these coils (290, 285) are energized. The energization of relay coil 285 immediately opens the normal holding circuit for "down" relay 250, but relay coil 290 closes its contacts 290a to complete a holding circuit which is only maintained until relay coil 326 is de-energized upon release of the latch members when the pile on the main hoist engages the thin pallet step and lifts the front edge of the pallet vertically to drop out coil 290 and coil 285. The contacts 285a close with a time delay to assure that contacts 290a are open and relay 250 de-energized when the contacts 285a close.

When the latch members 158 are cleared, the switches 170, 170' open and the relay coil 326 is de-energized causing the opening of its normally open contacts and the closing of its normally closed contacts, including the contacts 326d in the circuit for energizing the "Pull Pallet" lamp 229. The opening of contacts 326g in the circuit for effecting energization of relay coil 290 and, in turn, "down" relay coil 250, assures that the downward movement of the auxiliary hoist will stop after the latch members are cleared and prevent hanging up of the pallet lip on the new pile. When the contacts 326d close, the "Pull Pallet" lamp 229 is energized since the relay coil 338, originally energized by the actuation of relay coil 326, is maintained in an energized condition by its holding circuit and its normally open contacts 338c in the circuit for energizing the "Pull Pallet" lamp 229 remain closed. When the pallet is completely withdrawn, none of the switches 190, 191 will be closed and the relay 261 will then be de-energized. During the withdrawal operation, one of the sets of switches 190, 191 will always be in the closed position since before the withdrawal, the front switches 190 will be closed and as long as the pallet has the rear edge disposed beneath the rear edge of the remnant pile, the switches 191 will be closed. On complete withdrawal, however, the switches are opened and the change-over relay 261 is de-energized which opens the contacts 261d, 261c, de-energizing all the relays which are connected to L1c through these contacts, including the relay coil 338. The de-energization of the latter coil de-energizes the alarm 313 and the lamp 314 by opening contacts 338b.

After the pallet has been withdrawn completely and removed from the rails and their extensions, the extensions are folded up which effects a momentary closing of the limit switch 208. This energizes a relay coil 340 from L1c through the switch 208 and normally closed contacts 287b of the relay coil 287. The energization of relay coil 340 closes its normally open contacts 340a to complete a self-holding circuit around the switch 208, its contacts 340b connected in parallel with the contacts 310a to complete a circuit to energize the alarm 313 and lamp 314 from L1c through the contacts 315a of flasher 315, and its contacts 340c to energize lamp 237. This indicates that the arms of the auxiliary hoist are to be swung out. As the arms swing out, the limit switch 212 is momentarily actuated to energize the relay coil 287. The energization of relay coil 287 effects a continuous "down" operation of the auxiliary hoist in the manner described above through contacts 287a and the opening of its normally closed contacts 287b in the circuit for energizing the relay coil 340 causes de-energization of this latter relay and the opening of its contacts 340b to terminate the alarm and light.

In the preferred and illustrated embodiment, extra floating air is supplied during pallet withdrawal. In the type of pile elevating mechanism under consideration, and the sheet-separating mechanism associated therewith, floating air is normally delivered between the top sheets of a pile by a plurality of air nozzles 345 distributed along the rear edge of the pile and including nozzle for supplying extra floating air as described in application Ser. No. 702,604, filed Dec. 13, 1957, by Thos. J. Elliott and Sherman S. Watts. At the time that the pallet is to be withdrawn, it is desirable to supply additional air since the forward edge of the remnant pile will drop as the pallet is withdrawn from its pile-supporting position. A solenoid valve 346 is mounted above the rear edge of the pile and, when operated effects an additional supply of air to the air nozzles 345. The valve 346 is in a line between a pump and the nozzles 345. The solenoid valve 346 (Fig. 10) includes a solenoid 347 which is energized by a circuit including a switch 348 which is closed once during each cycle of the sheet-separating mechanism. The switch 348 has an actuator 349 which is operated by a cam 350 fixed to the shaft 105 and in each revolution of the shaft 105 the switch 348 is closed for a predetermined portion thereof to permit the extra floating air to be supplied from the pump to the nozzles. The circuit for energizing the solenoid 347 is shown on the circuit diagram. The solenoid 347 is connected to L2 by a direct connection and to L1c through a circuit connection which includes the normally open contacts 261d of the change-over relay coil 261, the normally open contacts 326e of the relay coil 326, and normally open contacts 351a of a relay 351 connected in parallel with the contacts 326e, and the switch 348. The closing of the limit switch 348 will effect a supply of extra floating air in the event that either the contacts 326e or the contacts 351a are closed after the closing of the contacts 261d by the taking of a pallet by the auxiliary hoist. It will be recalled that the contacts 261d are closed by the actuation of the limit switches 190 or 191 when the auxiliary hoist takes a pallet from the main hoist and the relay coil 326 is energized when the pallet latch is engaged during the withdrawal of the pallet, consequently the extra floating air will be supplied while the pallet latch is in engagement with the pallet. The relay coil 351 is energized by the operation of the relay coil 336 which is energized upon the closing of limit switch 202 during initial pallet withdrawal. The relay coil 336 actuates contacts 336c which, when closed, connect the relay coil 351 to L1c through the normally closed contacts 326f of relay coil 326 and the normally open contacts 261d of the change-over relay 261. Inasmuch as the relay coil 326 is de-energized until the pallet latch is engaged, the initial withdrawal of the pallet will effect energization of relay coil 351 to supply extra floating air. The energization of the relay coil 351 will also close its normally open contacts 351b to complete a holding circuit around the contacts 336c so that the relay coil 351 will remain energized until the relay coil 326 is de-energized to open the contacts 326f when the pallet is clear of the latch member. It can now be seen that extra floating air is supplied from the time that the limit switch 202 is actuated during initial pallet withdrawal until the limit switch 170 is returned to its normal condition after the pallet has cleared the latch members 158.

The control circuit for the mechanism is arranged so that the main hoist may be lowered at any time. The main hoist can be raised or lowered, as described hereinbefore, by operation of the clutch control lever 74. When the clutch control lever 74 is shifted in one direction, the clutch mechanism 62 is operated to effect operation of the main hoist in one of its directions and when the clutch lever 74 is shifted in the other direction, the clutch 71 actuates the main hoist in the opposite direction. To shift the clutch lever 74, the latch lever 80 must be raised manually if it has not been raised by the energization of the solenoid 145. It will be recalled that the solenoid 145 is energized when the switches 190 are closed by a pallet on the auxiliary hoist. The solenoid 145 may also be energized by closing a switch 360. The switch 360 is mounted, as described hereinafter, and the closing thereof will effect energization of a relay coil 361 having contacts 361a for connecting the connection 292 to L1 when the contacts 361a are closed. It will be recalled that the connection 292 when connected to L1 effects energization of the solenoid 145 through the operation of relays 298 and 295. The energization of the solenoid 145 operates so as to prevent the pawl 84 from engaging the ratchet wheel and releases the latch lever 80 to free the clutch lever 74.

If, however, the above control circuit is operating in its synchronized condition wherein the main hoist and the auxiliary hoist are both under the control of the pile height detecting means, the mere connection of connection 292 to L1 will not effect energization of the solenoid 145. Contacts 295a will be open in this condition. It will be recalled that when the hoists are synchronized, relay coil 295 is de-energized, but also that the time-delay relay coil 299 is energized through normally closed contacts 261c of the change-over relay 261 and its contacts 299a in the circuit for effecting energization of relay coil 298 and, in turn, coil 295 when L1 is applied to connection 292 are open. The relay coil 361 is provided, therefore, with normally open contacts 361b connected in parallel across the synchronize switch 242 and, more particularly, in parallel with the normally closed contacts 297 thereof. In the event that the circuit is operating in a synchronized condition, the closing of contacts 361b, 361c will effect the energization first of the relay coil 298 by reason of the contacts 361c and then the energization of relay coil 295, upon the closing of contacts 298a through the contacts 298a and the contacts 361b. This will then effect a closing of the contacts 295a of the relay coil 295 to energize the solenoid 145.

It can now be seen that, once the solenoid 145 is actuated through the closing of switch 360 to prevent control of the main hoist by the pile height detector, the motor 51 can operate to effect the raising or lowering of the main hoist, either through clutch control lever 74 or through a handle 390 as will be described hereinafter.

It is possible that while the main hoist is being raised by the operator with the clutch actuating lever 74 or the operating handle 390, the top of the pile on the main hoist might engage a pallet on the auxiliary hoist and lift the pallet and pile thereon from the rails 156, 157. If this happens, switch 226 (Fig. 16) supported on one of the front arms 154 will open, this switch normally being held in a closed position by a pallet on the rails. If the pallet is lifted, the switches 190, will also open to de-energize the change-over relay coil 261. The de-energization of the change-over relay coil 261 and the closing of the limit switch 226 will complete a circuit for energizing relay coil 365 having contacts 365a in parallel with contacts 310a, 340b, which effect energization of the alarm 313 and lamp 314 through the flasher contacts 315a when closed to operate the alarm intermittently and contacts 365b which are closed to energize lamp 225. The circuit for energizing relay coil 365 to effect operation of the alarm and the energization of the lamp 314 intermittently may be traced from L1c through normally closed contacts 261f actuated by the relay coil 261, the now closed switch 226, and normally closed contacts 366a of a relay coil 366. The contacts 366a of the relay coil 366 are closed as long as the relay coil 260, which is momentarily energized by the switch 213 as the auxiliary hoists are swung in, is de-energized. During normal operation, the relay coil 366 prevents the relay coil 365 from being energized by the closing of switch 226 by the pallet when the auxiliary hoist is being raised to take the pallet from the main hoist. When this operation is occurring, the relay coil 260 will have been energized momentarily by the swinging in of the arms of the auxiliary hoist to close its contacts 260c connecting relay coil 366 to L1c through the changeover relay contacts 261f. The momentary closing of the contacts 260c will energize the relay coil 366 to open its contacts 366a in the circuit for energizing relay coil 365 upon operation of the switch 226 adn will close its contacts 366b to make a self-holding circuit for the relay coil 366 which is broken only when the pallet is lifted from the main hoist and the change-over relay coil 261 is energized to open its contacts 261f. If can be seen, therefore, that the closing of the switch 226 before the energization of the change-over relay coil 261 when the auxiliary hoist is operating to take a pallet from the main hoist will not effect energization of the relay coil 365 to signal a lowering of the main hoist.

Attention is directed to the fact that whenever the main hoist is to be lowered by the reason of the fact that the hoist has been elevated too far and has lifted the pallet from the auxiliary hoist and actuate the limit switch 226, or by reason of the fact that the main hoist has been elevated to a level where the pallet is to be transferred to the auxiliary hoist or the arms of the auxiliary hoist are to be swung out, the alarm is sounded intermittently. Whenever the pallet is to be pulled, either in the initial stage of withdrawal or the final stage of withdrawal, the alarm sounds continuously.

Attention is also directed to the fact that the Power-On-Off relay coil 245, when de-energized, kills the above described control circuit, with the exception that the closing of the switch 360 (Fig. 1) will be effective to energize the solenoid 145 to lift the pawl 84. This is because the switch 360 and the relay 361 are connected directly across L1, L2 rather than across L1c, L2 and the contacts 361a connect L1 directly to the connection 292 for operating the relays 295, 299, 298 and 302 in a manner to effect a lifting of the pawl. This is important since the motor 51 is not energized through the above-described control circuit, and during operation of the pallet elevating mechanism it is desirable to be able to raise the main hoist to an elevation where the sheets on a pallet supported on the main hoist can be removed from the main hoist with the transferring of the pallet to the auxiliary hoist. The circuit for energizing the motor 51 is shown as connected across L1, L2 and includes a motor contactor relay 370 which is energizable from L1 through a holding circuit having contacts 245c connected in parallel with main hoist safety limit switches 218 and self-holding contacts 370a. If the power-on button 244a is depressed to energize the described control circuit, the contacts 245c open, making the limit switches 218 effective to limit the upward travel of the main hoist by operation of the motor 51. If, however, the control power is off, the normally closed contacts 245c are closed enabling the main hoist to be operated past the main hoist safety switches 218. In this condition, a safety is provided by the pile-actuated, high limit safety switch 270 (Fig. 14) which has back contacts 270a connecting relay coil 370 to L2 and which open when the switch is closed.

In the type of elevating mechanism described, it is desirable to have backstops which engage the rear edge of the remnant pile when the pallet is being withdrawn. In Fig. 21 such a backstop is shown supported above the rear edge of the pile, it being understood that one or more of these backstops could be used. The backstop comprises a generally vertical backstop member 400 supported in an arm 401 for vertical sliding movement. The arm 401 is movably guided by a bracket 402 and can be reciprocated between a position where the member 400 is in engagement with the rear edge to a position clear of the rear edge of the pile. A solenoid 405 is provided for reciprocating the arm and has an armature 406 connected to a link 407 pivoted to the bracket 402 to reciprocate the latter, the link 402 being pivotally connected to reciprocate the arm 401 to move the member 400 into and out of position. The solenoid 405 is connected in parallel with the "Pull Pallet" light 229 so that, whenever the "Pull Pallet" light 229 is energized, as described above, the solenoid 405 is energized to move the backstop to its position in engagement with the rear edge of the remnant pile. The backstop is slidably supported in its arm so that it can move upwardly with the pallet and pile on the auxiliary hoist while it is in engagement with the rear edge thereof.

Summarizing the operation of the disclosed and described pile elevating mechanism, when the first pile is brought into position on the main hoist, the main hoist is operated under the control of the pile height detecting means and the ratchet wheel 90 and pawl 84 to maintain the top of the sheets on the main hoist at the level necessary for the proper operation of the separating suckers 11. After the main hoist has been elevated sufficiently to actuate limit switch 216, the alarm sounds intermittently and the operator receives a signal to swing in the arms of the auxiliary hoist. As the arms of the auxiliary hoist are swung in, the switch 213 is operated to effect a raising of the auxiliary hoist to lift the pallet from the main hoist and, when the pallet is lifted and actuates switches 190, the pile height detecting means is connected to control the auxiliary hoist to raise the latter incrementally to maintain the top of the pile thereon at the proper level. The switches 190 also effect energization of solenoid 145 to lift latch lever 80 and pawl 84.

The main hoist is then lowered by operating either the clutch control level 74 or the operating handle 390 which have been released by operation of solenoid 145 and as the switch 216 is opened, the alarm stops and the lower hoist signal is de-energized. When the main hoist has been lowered, the operator brings a new pile into position on the main hoist and immediately operates the main hoist through the clutch control lever 74 or handle 390 to raise the hoist to a position where the top of the pile thereon is immediately under and in close proximity to the bottom of the pallet on the auxiliary hoist. When the pile on the main hoist is disposed with the top thereof immediately below the pallet on the auxiliary hoist, the "synchronize" switch 242 is actuated to place both the main hoist and the auxiliary hoist under the control of the pile height detecting means 100. Inasmuch as the drums for the cables of the main hoist are narrow drums and the cables wind upon themselves, the main hoist at the time that the "synchronize" button is depressed is preferably positioned so that the top of the pile thereon is just a little below the pallet so that, as the effective diameter of the drums increases, the additional amount that the main hoist is raised in proportion to the amount that the auxiliary hoist is raised will not effect a closing of the gap and a pinching of the top sheet of the new pile against the pallet on the auxiliary hoist. Preferably, the hoists are designed so that the hoists will have an almost equal amount of movement when the main hoist is in the position that it would occupy with a new pile thereon and with the top thereof just below the pallet on the auxiliary hoist and with approximately four inches of sheet pile left on the auxiliary hoist.

When the sheet pile on the auxiliary hoist has been depleted to a predetermined point, preferably to about 1½", the auxiliary hoist actuates limit switch 231 which causes the alarm to sound continuously to signal the withdrawal of the pallet. The pallet is then withdrawn until the latch members 158 engage to arrest the continued withdrawal of the pallet. The initial withdrawal movement of the pallet is sensed by switch 202 which operates to maintain the alarm sounding and to effect the supply of additional floating air and to position backstop means, if provided, against the rear edge of the remnant pile. The switches 170 sense the engagement of the latch members and effect the actuation of the lamp 234 which signals that the main hoist should first be raised to the bottom of this pallet portion 205 and then the hoists should be moved relative to each other to lift the pallet clear of the latch members 158. When the latch members are cleared, the signal for pulling the pallet is again energized and the alarm sounds continuously until the withdrawal of the pallet is completed. When the withdrawal is completed, the limit switches 191 open, the solenoid 145 is de-energized, and the pile height detector is connected to control only the main hoist. The pallet is removed and the rail extensions 199 are then swung upwardly, actuating the switch 208 to effect a signalling that arms of the auxiliary hoist should be swung out. When the arms of the auxiliary hoist are swung out, limit switch 212 is actuated to effect a continuous down movement of the auxiliary hoist until the hoist is positioned in its lower limit position where it is adapted to subsequently take the raised pallet from the main hoist. The down movement of the auxiliary hoist is terminated by operation of limit switch 256.

It will be noted that the main hoist may be lowered at any time that switches 190, 191 are closed through the operation of clutch lever 74, since the solenoid 145 is energized and the latch member 80 is lifted to release position. The lever 74 can be actuated at other times by manually lifting the latch lever 80.

Figure 5:
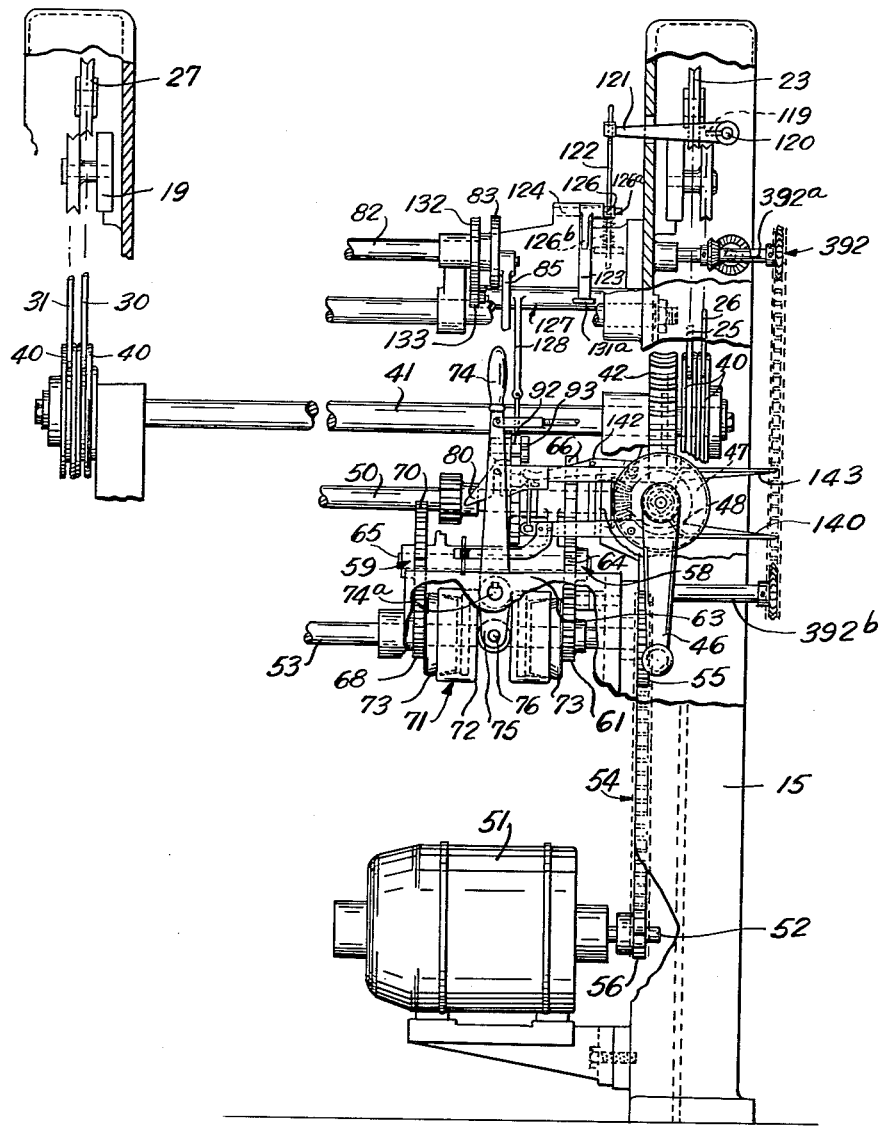
Fig. 5 is a fragmentary elevational view with parts cut away and removed taken from the left-hand side of Fig. 1.

It is desirable to be able to operate the clutch lever 74 from the rear of the elevating mechanism and, to this end, the operating handle 390 (Fig. 1) is fixed to the rear end of a shaft 391 journaled in the rear upright 17 adjacent the side frame member 18 and extending to the front of the elevating mechanism and connected through a drive 392 (Fig. 5) including shafts 392a, 392b to effect rotation of the shaft 74a to which the clutch lever 74 is fixed so that the handle 390 may be swung to rock the shaft 74a. The handle 390 includes a hand-grip portion with a depressible or squeeze member 394. The member 394 is depressible against a spring bias and when depressed operates the limit switch 360 through a linkage 395 for energizing solenoid 145 to lift the latch lever 80 and the pawl 84. The operation upon the closing of switch 360 has heretofore been described. The handle 390 greatly facilitates the operation of the elevating mechanism by a single operation.

During operation of the described pile elevating mechanism, it is desirable that the pawl lift member 91 not be dropped suddenly to allow the pawl 84 to quickly drop into engagement with the ratchet wheel 90. In the preferred embodiment, a snubber cylinder 440 is provided (see Fig. 6). A piston operates in the snubber cylinder and has a piston rod 441 which extends upwardly therefrom and is connected to a bracket 442 by a noddle pin connection 443. The bracket 442 is fixed to the lever 140 for raising the lever 142 to effect a lifting of the pawl lift member 91 and its arm 92. The snubber cylinder 440 acts to cause the lever 142 to drop slowly when the lever 140 is released.

It can now be seen that the present invention has provided a new and improved pile elevating mechanism and while the preferred embodiment has been described in considerable detail, it is hereby our intention to cover all modifications, constructions and arrangements which fall within the ability of those skilled in the art and the scope and spirit of the present invention.

Having thus described our invention, what we claim is:

1. A pile elevating mechanism, comprising a main hoist, an auxiliary hoist for supporting a pile of sheets on a pallet above the main hoist, first and second means each selectively operable in opposite directions for respectively vertically raising and lowering a respective one of said hoists independently of the other, pile height detecting means mounted to operate at a predetermined sheet feed level for gauging the position of a pile at such level on one or the other of said hoists, means operatively connecting the pile height detecting means with one or the other of said raising and lowering means to cause intermittent operation of one of said hoists to maintain the top of the pile at the predetermined feed level, and means for enabling operation of the raising means for both of said hoists together at substantially the same rate of upward travel under control of said pile height detecting means at least at a time when a new pile on the main hoist is brought immediately below a pile supported on a pallet on the auxiliary hoist.

2. A pile elevating mechanism according to claim 1 wherein the raising and lowering means for said main hoist includes cable supports for the main hoist, and the auxiliary hoist raising and lowering means comprises jackscrew and nut means supporting said auxiliary hoist.

3. A pile elevating mechanism according to claim 1 wherein the means for raising and lowering said main hoist includes drum means on which the main hoist cables wind over previously wound portions thereof, and wherein the effective diameter of the drums plus the previously wound cable portions will feed the main hoist upwardly at substantially the same rate of upward feed of the screw and nut means at a preselected elevation corresponding to a predetermined pile height on the auxiliary hoist.

4. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level as sheets are removed therefrom, an auxiliary hoist disposed above said main hoist and adapted to take a remnant pile from the latter and continue its elevation to maintain the top thereof at feed level, pile height detecting means for determining the height of the pile from which sheets are being removed, first control means for intermittently raising said auxiliary hoist under the control of said pile height detecting means to maintain the top of a pile supported thereby at feed level, drive means for raising and lowering said main hoist comprising means operable in forward and reverse directions to respectively raise and lower the main hoist continuously and means responsive to said pile height detecting means to effect intermittent raising of the main hoist in accordance with the level of the pile sensed by said detecting means, disconnect means actuatable between first and second conditions to respectively render said pile height detecting means effective and ineffective to raise said main hoist, sensing means operated to a first position in response to the taking of a pile by said auxiliary hoist to effect operation of said disconnect means to its said second condition to render said pile height detecting means ineffective to operate said main hoist, and means for selectively placing said main hoist under the control of said pile height detecting means with the sensing means in its said first position and a pile on said auxiliary hoist.

5. A pile elevating mechanism for elevating a sheet pile to a feed level where the top sheets are to be removed one at a time from the top of the pile, said mechanism comprising a main hoist for elevating a pile to said level and intermittently operable to maintain the top thereof at said level while sheets are removed therefrom, an auxiliary hoist disposed above said main hoist and adapted to take a remnant pile from the latter and continue its elevation intermittently to maintain the top thereof at feed level, pile height detecting means for determining the height of the pile from which sheets are being removed, first control means for raising said auxiliary hoist intermittently under the control of said pile height detecting means to maintain the top of a pile supported thereby at feed level, drive means for raising said main hoist intermittently under the control of said pile height detecting means, disconnect means for effectively connecting and disconnecting said detecting means to and from said drive means to render said detecting means effective and ineffective to operate said drive means, sensing means responsive to the taking of the pile by said auxiliary hoist to operate said disconnect means to effectively disconnect said detecting means from said main hoist, and means selectively operable to raise and lower said main hoist independently of said pile height detecting means comprising control means operable to start and stop operation of the main hoist, and means selectively operable to override said sensing means and actuate said disconnect means to connect said pile height detecting means in contolling relationship with said main hoist while a pile is on the auxiliary hoist.

6. A pile elevating mechanism for elevating a sheet pile to a feed level where sheets are removed one at a time from the top of the pile, said mechanism comprising a main hoist for elevating a pallet supporting a pile to raise the top of the pile to feed level and intermittently operable to maintain the top of the pile at feed level while sheets are removed therefrom, an auxiliary hoist disposed above said main hoist and adapted to take the pile supporting pallet from the main hoist when the pallet reaches a predetermined elevation and continue its elevating movement intermittently to maintain the top of the pile thereon at feed level, said auxiliary hoist being constructed to permit the horizontal withdrawal of the pallet from one edge of the pile to deposit the partially depleted pile on the pallet onto a new pile supported by the main hoist below the pallet and said pallet having a narrow portion along the forward edge thereof which is withdrawn last from underneath the pile and which is of lesser thickness than the remainder of the pallet so that when only the narrow portion is under the rear side of the pile the maximum thickness of the pallet between the piles is reduced and the main hoist may be raised closer to the underside of the sheet supported by the forward edge of the pallet, releasable latch means on said auxiliary hoist and engageable with said pallet to stop the withdrawal movement thereof when its wider portion has cleared the pile but with said narrow portion under the pile at its one edge, pile height detecting means for sensing the level of the pile from which sheets are being taken adjacent its said one edge, first control means for intermittently raising said auxiliary hoist under the control of said pile height detecting means, second control means for intermittently raising said main hoist under the control of said detecting means, means operable to render both of said first and second control means responsive to said pile height detecting means whereby both of said hoists are raised when the detecting means detects a low level, and control means for selectively overriding the control of said detecting means when the latter is operating both of said hoists to relatively move the hoists to position the top of the lower pile adjacent the underside of the narrow pallet portion preparatory to completing pallet withdrawal.

7. A pile elevating mechanism according to claim 6 and further comprising means responsive to the engagement of said latch means for signalling the movement of said hoists toward each other and responsive to the release of said latch means for signalling further pallet withdrawal.

8. A pile elevating mechanism according to claim 6 wherein said latch means is releasable by relative movement between said latch means and pallet in a vertical direction to move said pallet upwardly relative to said latch means whereby said latch means may be released by operating the last-said control means to move said hoists toward each other to engage the pallet with the pile thereunder and lift the pallet clear of the latch means.

9. A pile elevating mechanism according to claim 6 wherein said latch means is releasable by relative movement between said latch means and pallet in a vertical direction to move said pallet upwardly relative to said latch means whereby said latch means may be released by operating the last said control means to lift the pallet clear of the latch means, and means for sensing and signalling the clearing of the pallet with respect to the latch means.

10. In a pile elevating mechanism including main and auxiliary hoists with the latter being disposed above the main hoist and adapted to take a pile supporting pallet therefrom and continue the elevation of the pallet and being constructed so that the pallet may be withdrawn outwardly of one edge of a partially depleted pile thereon to deposit the latter on a new pile disposed therebelow on the main hoist, said pallet having a forward edge which is the last to be withdrawn and a narrow portion along the forward edge narrower than the remainder of the pallet whereby the pallet may be partially withdrawn to a predetermined position wherein said narrow portion supports the said one edge of the partially depleted pile with the remainder of the pallet disposed outwardly of the piles whereby the pallet thickness between the piles is reduced and one of the hoists can be operated to relatively move the underside of the narrow portion and the top of the new pile toward each other diminishing the drop for said one edge upon subsequent complete withdrawal of the pallet, and releasable latch means on said auxiliary hoist engageable with said pallet when moved to said predetermined position to arrest continued withdrawal of said pallet.

11. A pile elevating mechanism according to claim 10 and further comprising means responsive to the engagement of said latch means for signalling the movement of said hoists toward each other and responsive to the release of said latch means for signalling the further pallet withdrawal.

12. In a pile elevating mechanism, including main and auxiliary hoists with the latter being disposed above the main hoist and adapted to take a pile supporting pallet therefrom and continue the elevation of the pallet and being constructed so that the pallet may be withdrawn outwardly of one edge of a partially depleted pile thereon to deposit the latter on a new pile disposed therebelow on the main hoist, said pallet having a forward edge which is the last to be withdrawn and a narrow portion along the forward edge narrower than the remainder of the pallet whereby the pallet may be partially withdrawn to a predetermined position wherein said narrow portion supports the said one edge of the partially depleted pile with the remainder of the pallet disposed outwardly of the piles whereby the pallet thickness between said piles is reduced and one of the hoists can be operated to relatively move the underside of the narrow portion and the top of the new pile toward each other thereby diminishing the drop for said one edge upon complete withdrawal of the pallet, releasable latch means on said auxiliary hoist engageable with said pallet when moved to said predetermined position to prevent continued withdrawal of said pallet, said latch means comprising a movable member and an abutment carried by respective ones of said pallet and auxiliary hoist and engageable with each other when said pallet is in said predetermined position, said movable member being biased to move toward a position to engage said abutment.

13. In a pile elevating mechanism, the structure as defined in claim 12 wherein one of said movable member and abutment is supported for adjusting movement along the path of pallet withdrawal to determine the position of engagement.

14. In a pile elevating mechanism, the structure as defined in claim 13 wherein said pallet has a recess in the bottom thereof providing said abutment and said movable member is disposed below said pallet on said auxiliary hoist and is urged toward said pallet and is mounted for movement relative to said auxiliary hoist and into said recess.

15. In a pile elevating mechanism, the structure as defined in claim 13 wherein said auxiliary hoist comprises pallet engaging members having portions disposable below said pallet to support the latter, said movable member being mounted on one of said members for movement into a recess on said pallet providing said abutment and being disengageable from said abutment by relative vertical movement between said pallet and one member.

16. In a pile elevating mechanism as defined in claim 15 and further comprising control means operable to effect said relative movement to disengage said abutment and movable member and means responsive to the disengagement to terminate the relative movement.

17. In a pile elevating mechanism, including main and auxiliary hoists with the latter being disposed above the main hoist and adapted to take a pile supporting pallet therefrom and continue the elevation of the pallet and being constructed so that the pallet may be withdrawn outwardly of one edge of a partially depleted pile thereon to deposit the latter on a new pile disposed therebelow on the main hoist, said pallet having a forward edge which is the last to be withdrawn and a thin portion along the forward edge narrower than the remainder of the pallet whereby the pallet may be partially withdrawn to a predetermined position wherein said thin portion supports the said one edge of the partially depleted pile with the remainder of the pallet disposed outwardly of the piles whereby the pallet thickness between said piles is reduced and one of the hoists can be operated to relatively move the underside of the thin portion and the top of the new pile toward each other to reduce the drop for said one edge upon complete withdrawal of the pallet, and releasable latch means on said auxiliary hoist engageable with said pallet when moved to said predetermined position to prevent continued withdrawal of said pallet, said latch means comprising cooperating abutments on said pallet and auxiliary hoist respectively, said abutments being disposed to clear each other on relative vertical movement between said hoist and said pallet in a direction to lift said pallet from said hoist.

18. In a pile elevating mechanism, the structure as defined in claim 17 wherein control means is provided to lower said auxiliary hoist when said abutments are engaged to rest the thin portion of the pallet thereon on a pile disposed on the main hoist and to effect vertical relative movement between said abutments, said control means including means responsive to the clearing of said abutments for terminating the lowering of said auxiliary hoist.

19. In a pile elevating mechanism, including main and auxiliary hoists with the latter being disposed above the main hoist and adapted to take a pile supporting pallet therefrom and continue the elevation of the pallet and being constructed so that the pallet may be withdrawn outwardly of one edge of a partially depleted pile thereon to deposit the latter on a new pile disposed therebelow on the main hoist, said pallet having a forward edge which is the last to be withdrawn and a narrow portion along the forward edge narrower than the remainder of the pallet whereby the pallet may be partially withdrawn to a predetermined position wherein said narrow portion supports the said one edge of the partially depleted pile with the remainder of the pallet disposed outwardly of the piles whereby the thickness of the pallet between said piles is reduced and one of the hoists can be operated to relatively move the underside of the narrow portion and the top of the new pile toward each other to reduce the drop for said one edge upon complete withdrawal of the pallet, releasable latch means on said auxiliary hoist engageable with said pallet when moved to said predetermined position to arrest continued withdrawal of said pallet, said latch means comprising cooperating abutments on said pallet and auxiliary hoist respectively, one of said abutments being supported for movement in the direction that the abutment is urged when holding said pallet against movement by a pallet withdrawal force, means yieldably opposing movement of said one abutment by said force, and control means responsive to the yielding of said abutment to sense and signal the engagement of said latch means and responsive to the return of said abutment to signal the release of said latch means.

20. In a pile elevating mechanism, the structure as defined in claim 19 wherein said abutments are disposed to clear each other on relative vertical movement between said hoists and pallet in a direction to lift said pallet from said auxiliary hoist.

21. The method of clearing a pallet from a latch member received in a recess in the underside of the pallet when supported on an auxiliary hoist of a pile elevating mechanism and above a pile on a main hoist of the mechanism which comprises the step of operating one of the hoists to move the pallet into engagement with the top of the pile on the main hoist and lift the pallet from the latch member.

22. The method of operating a pile elevating mechanism having a main hoist for supporting a pile carrying a pallet and raising it to position and maintain the top thereof at a level to have sheets taken therefrom one at a time and an auxiliary hoist adapted to take the pallet and pile from the main hoist after the latter has reached a predetermined elevation and the pile partially depleted to continue to elevate the pile while a new pile carrying pallet is positioned on the main hoist, the pallet on the auxiliary hoist thereafter to be withdrawn to deposit the pile thereon onto the top of the new pile, said method comprising lowering the main hoist after the pallet with the partially depleted pile thereon has been taken by the auxiliary hoist, bringing a new pile into position on the main hoist, raising the main hoist as soon as the new pile is in position to elevate the top of the new pile to a position immediately below the pallet on the auxiliary hoist and prior to the time that the pallet is to be withdrawn to deposit the pile on the auxiliary hoist onto said new pile, operating said hoists together in accordance with the level of the pile on the auxiliary hoist to maintain the top of the new pile immediately below the pallet on the auxiliary hoist until the pile on the auxiliary hoist is depleted to a point where it is to be combined with the new pile and then withdrawing the pallet on the auxiliary hoist to combine the piles.

23. The method of continuously replenishing a pile of sheets from below, comprising the steps of supporting a first pile on a main hoist and feeding sheets therefrom one at a time, detecting the top level of said pile, periodically raising the first pile in accordance with the detected level to maintain the top thereof at a predetermined feed level, transferring the pile to an upper auxiliary hoist when the first pile has been substantially depleted, lowering the main hoist to receive a second pile and thereafter raising the main hoist to position the top of the second pile in closely spaced relationship to the bottom of the first pile, detecting the top level of the first pile during the lowering and raising of the main hoist and periodically raising the auxiliary hoist in accordance with the detected level to maintain the top of the first pile at said feed level, periodically raising both the first and second piles in accordance with the detected feed level of the first pile at substantially the same rate after the second pile has been positioned closely beneath the first pile, thereafter depositing the first pile onto the second pile, the feeding of sheets being continuous and the maintenance of the piles at the feed level being constant throughout the replenishing operation, and raising the combined first and second piles in accordance with the detected level of the top thereof.

No references cited.